United States Patent [19]

Wada et al.

[11] Patent Number: 4,789,944

[45] Date of Patent: Dec. 6, 1988

[54] DESIGN SUPPORT METHOD AND APPARATUS THEREFOR

[75] Inventors: Yutaka Wada, Hitachi; Takashi Kiguchi, Mito; Yasuhiro Kobayashi, Katsuta; Toru Mitsuta, Hitachi, all of Japan

[73] Assignee: Hitachi, Ltd., Tokyo, Japan

[21] Appl. No.: 838,957

[22] Filed: Mar. 12, 1986

[30] Foreign Application Priority Data

Mar. 18, 1985 [JP] Japan .................................. 60-53764

[51] Int. Cl.[4] .......................................... G06F 15/606
[52] U.S. Cl. .................................... 364/488; 364/490; 357/40
[58] Field of Search ............................. 364/488–491; 357/40, 45; 307/240, 465.1, 482.1

[56] References Cited

U.S. PATENT DOCUMENTS 4,377,849 3/1983 Finger et al. .................. 364/300 X Primary Examiner—Parshotam S. Lall
Assistant Examiner—Joseph L. Dixon
Attorney, Agent, or Firm—Antonelli, Terry & Wands

[57] ABSTRACT

A design support apparatus displays components of a design object on a display screen in the same positional relationship as that of actual layout, and graphically displays an installation inhibit area for the components which is derived from the design object or its components, on the display scree. An operator may design the layout while he/she looks as the display screen to designate installation position of the components so that they do not enter into the installation inhibit area. The installation inhibit area displayed on the screen may be a minimal space from a wall of the component or a working space for the component.

31 Claims, 21 Drawing Sheets

FIG. I

| ITEM | CONTENT |
|---|---|
| LINE CODE | HD 9 |
| CLASS | PIPE |
| SYSTEM | HD |
| DIAMETER | 600 |
| LIQUID TEMPERATURE | HIGH TEMPERATURE |
| LIQUID TYPE | VAPOR DRAIN |
| START POINT CODE | A-22 |
| END POINT CODE | N21-B003A |
| PIPE CONNECTION | CONNECT IN ORDER OF A-22, RE-10, N21-F10 AND N21-B003A-7 |
| INTERMEDIATE DEVICE CODE | RE-10 |
| | N21-F10 |

FIG. 4

| ITEM | | CONTENT |
|---|---|---|
| CODE | | N21-B003A |
| CLASS | | DEVICE |
| TYPE | | HEAT EXCHANGER |
| NOZZLE | | N21-B003A-7 |
| | | N21-B003A-8 |
| INSTALLATION POSITION | X | $a_1$ (mm) |
| | Y | $b_1$ (mm) |
| | Z | $c_1$ (mm) |
| SIZE | X | $j_1$ (mm) |
| | Y | $k_1$ (mm) |
| | Z | $l_1$ (mm) |

FIG.5A

| ITEM | | CONTENT |
|---|---|---|
| CODE | | RE-10 |
| CLASS | | INTERMEDIATE DEVICE |
| TYPE | | REDUCER |
| INSTALLED PIPE CODE | | HD9 |
| INSTALLATION POSITION | | BETWEEN N21-F10 & A-22 |
| | X | |
| | Y | |
| | Z | |

FIG.5B

| ITEM | | CONTENT |
|---|---|---|
| CODE | | N21-F10 |
| CLASS | | INTERMEDIATE DEVICE |
| TYPE | | SLUICE VALVE |
| INSTALLED PIPE CODE | | HD9 |
| DIAMETER | | 600 |
| INSTALLATION POSITION | X | $a_3$ (mm) |
| | Y | $b_3$ (mm) |
| | Z | $c_3$ (mm) |

FIG.5C

| ITEM | | CONTENT |
|---|---|---|
| CODE | | A-22 |
| CLASS | | DEVICE |
| TYPE | | TANK |
| INSTALLED PIPE CODE | | HD9 |
| INSTALLATION POSITION | X | $a_4$ (mm) |
| | Y | $b_4$ (mm) |
| | Z | $c_4$ (mm) |
| SIZE | X | $j_2$ (mm) |
| | Y | $k_2$ (mm) |
| | Z | $l_2$ (mm) |

FIG.5D

| ITEM | | CONTENT |
|---|---|---|
| CODE | | N21-B003A-7 |
| CLASS | | DEVICE |
| TYPE | | NOZZLE |
| INSTALLED DEVICE CODE | | N21-B003A |
| INSTALLATION POSITION | X | $a_2$ (mm) |
| | Y | $b_2$ (mm) |
| | Z | $c_2$ (mm) |

FIG. 6A (a)

| NO. | RESTRICTION ITEM | NUMBER OF CONDITION DATA | CONDITION DATA | | |
|---|---|---|---|---|---|
| | | | CLASS | TEMPERATURE | SYSTEM |
| 1 | INHIBITION OF INSTALLATION | 3 | PIPE | HIGH TEMPERATURE | HD |

(b)

| CONCLUSION DATA | | DESIGN REFERENCE |
|---|---|---|
| CODE | VALUE | |
| HD 9 | DEVICE TAKE-OUT SPACE | HIGH TEMPERATURE HD-SYSTEM PIPE SHOULD NOT BE INSTALLED AT DEVICE TAKE-OUT SPACE |

FIG. 6B (a)

| NO. | RESTRICTION ITEM | NUMBER OF CONDITION DATA | CONDITION DATA | |
|---|---|---|---|---|
| | | | CLASS | TYPE |
| 2 | LENGTH OF STRAIGHT PIPES ADJACENT TO REDUCER | 2 | INTERMEDIATE DEVICE | REDUCER |

(b)

| CONCLUSION DATA | | DESIGN REFERENCE |
|---|---|---|
| CODE | VALUE | |
| RE-10 | 3D | LENGTH OF STRAIGHT PIPES ADJACENT TO REDUCER SHOULD BE NOT LESS THAN THREE TIMES OF DIAMETER D OF PIPE |

FIG. 6C (a)

| NO. | RESTRICTION ITEM | NUMBER OF CONDITION DATA | CONDITION DATA | | |
|---|---|---|---|---|---|
| | | | CLASS | SYSTEM | DIAMETER |
| 3 | MINIMUM WALL SPACING | 3 | PIPE | HD | 600 |

(b)

| CONCLUSION DATA | | DESIGN REFERENCE |
|---|---|---|
| CODE | VALUE | |
| HD 9 | 300 | HD PIPE HAVING DIAMETER OF 600 mm SHOULD BE SPACED NOT LESS THAN 300mm FROM WALL |

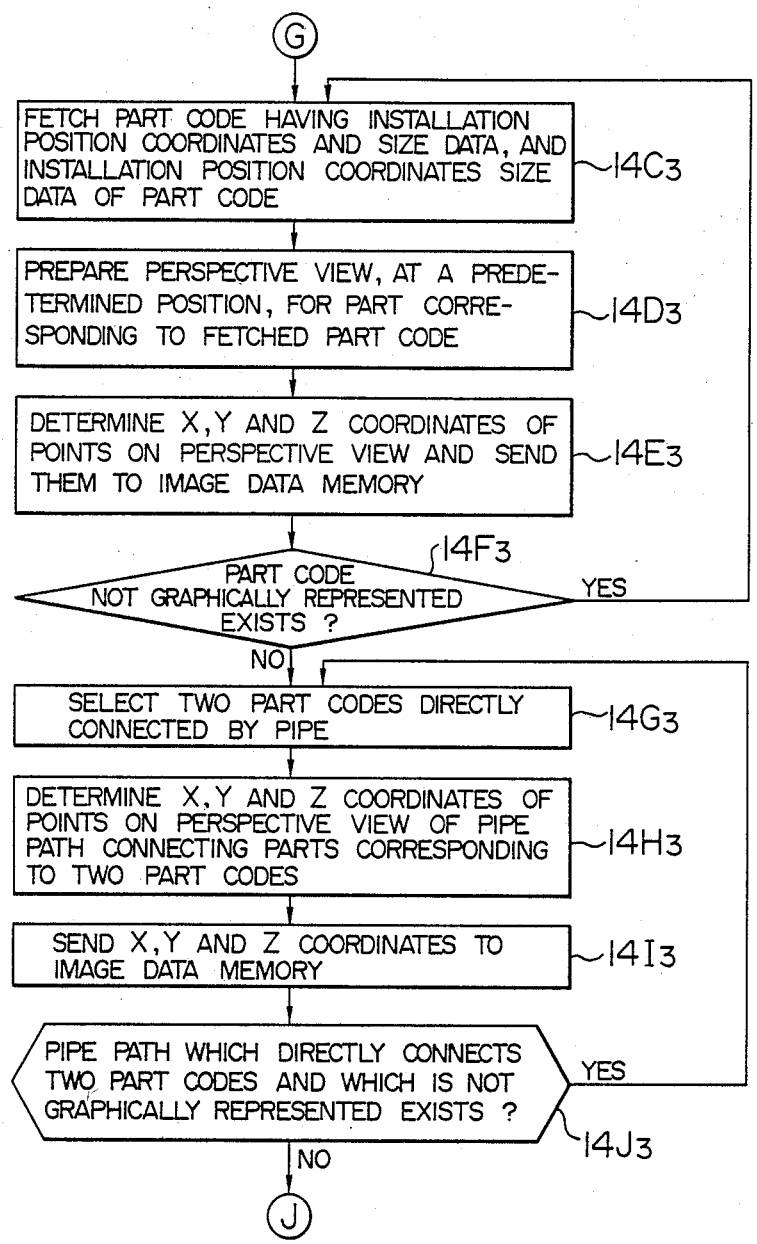

FIG. 16

| DESIGN DATA | |
|---|---|
| LINE CODE | HD9 |
| SYSTEM | HD |
| DIAMETER | 600 |
| START POINT | A-22 |
| END POINT | N21-B003A |
| INTERMEDIATE DEVICE | REDUCER, RE-10<br>SLUICE VALUE, N21-F10 |
| PIPE CONNECTION | IN THE ORDER OF A-22, RE-10, N21-F10 AND N21-B003A-7 |

| DESIGN REFERENCES | |
|---|---|
| 1 | HD PIPE SHOULD NOT BE INSTALLED IN A DEVICE TAKE-OUT SPACE |
| 2 | LENGTH OF STAIGHT PIPES CONNECTED TO REDUCER SHOULD BE NOT LESS THAN 3 TIMES OF PIPE DIAMETER |
| 3 | SPACING BETWEEN HD PIPE NOT LESS THAN 600mm IN DIAMETER AND WALL SHOULD BE NOT LESS THAN 300mm |

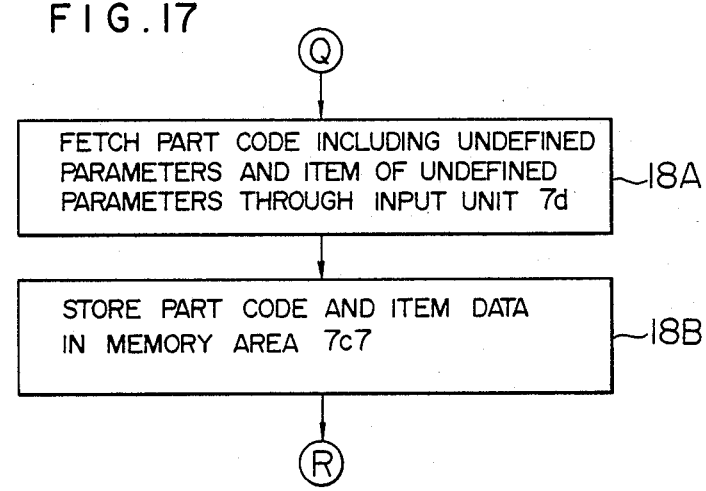

FIG. 17

| NO. | RESTRICTION ITEM | NUMBER OF CONDITION DATA | CONDITION DATA CLASS | CONCLUSION DATA CODE | CONCLUSION DATA VALUE | DESIGN REFERENCE |
|---|---|---|---|---|---|---|
| 4 | INHIBITION OF INSTALLATION | 1 | PIPE | | MOVE ZONE OF WHIST | PIPE SHOULD NOT BE INSTALLED IN MOVE ZONE OF WHIST |

DESIGN SUPPORT METHOD AND APPARATUS THEREFOR

BACKGROUND OF THE INVENTION

The present invention relates to design support method and apparatus therefor, and more particularly to a design support method and an apparatus which enable a designer to rapidly retrieve design data and reflect restrictions on design references without failure.

In a prior art design support system as disclosed in Japanese Unexamined Patent Publication No. 59-45575, a display screen for a design object and a display screen for an input menu of design parameters are independent from each other and design data is displayed on split screens or a plurality of CRT screens. In this system, rapid and accurate entry of the design parameters is permitted but no consideration is paid to the checking of the validity of the design parameters. In Japanese Unexamined Patent Publication No. 59-66763, piping data are retrieved by a computer designed for piping path design and a pipe interval is calculated on the basis of pipe diameters and thicknesses of heat insulating materials. In this system, design parameters are combined to introduce comparative values to design references and they are displayed but the comparison with the design reference for each pipe should be done by a designer.

SUMMARY OF THE INVENTION

It is an object of the present invention to provide a design support method which can reduce violation of restricted items of design references and improve design efficiency.

It is another object of the present invention to provide a design support apparatus which embodies the above design support method.

In one aspect of the present invention, in a course of design of a design object, an operator displays the design object on a display by means of graphic patterns of components of the design object and graphic patterns of a restriction area derived from the design object and its components. Since the operator can continue to design while he/she watches the restriction area on the display screen, an error free design is accomplished with a high efficiency.

In accordance with another aspect of the present invention, there is provided a design support method characterized by selecting design data and design reference data for a design object, generating first information for graphically representing a structure of the design object based on the selected design data, generating second information for graphically representing a restriction area for the structure of the design object based on the selected design reference data, and displaying the first and second information on a display device.

In accordance with a further aspect of the present invention, there is provided a design support apparatus comprising a console panel for designating a design object, a first memory for storing therein design data, a second memory for storing therein design reference data, a third memory for storing therein a procedure for selecting design data from the first memory based on the design object entered from the console panel, generating first information for graphically representing a structure of the design object based on the selected design data, selecting design reference data from the second memory based on the design object entered from the console panel and generating second information for graphically representing a restriction area for the structure of the design object based on the selected design reference data, processing means for generating the first and second information in accordance with the stored procedure, and a display unit for graphically displaying the first and second information outputted by the processing means.

BRIEF DESCRIPTION OF THE DRAWINGS

FIG. 16 shows an image of information derived from the step 17, FIG. 17 shows a detailed flow chart of a step 18 of FIG. 7.

DESCRIPTION OF THE PREFERRED EMBODIMENTS

Figure 1:
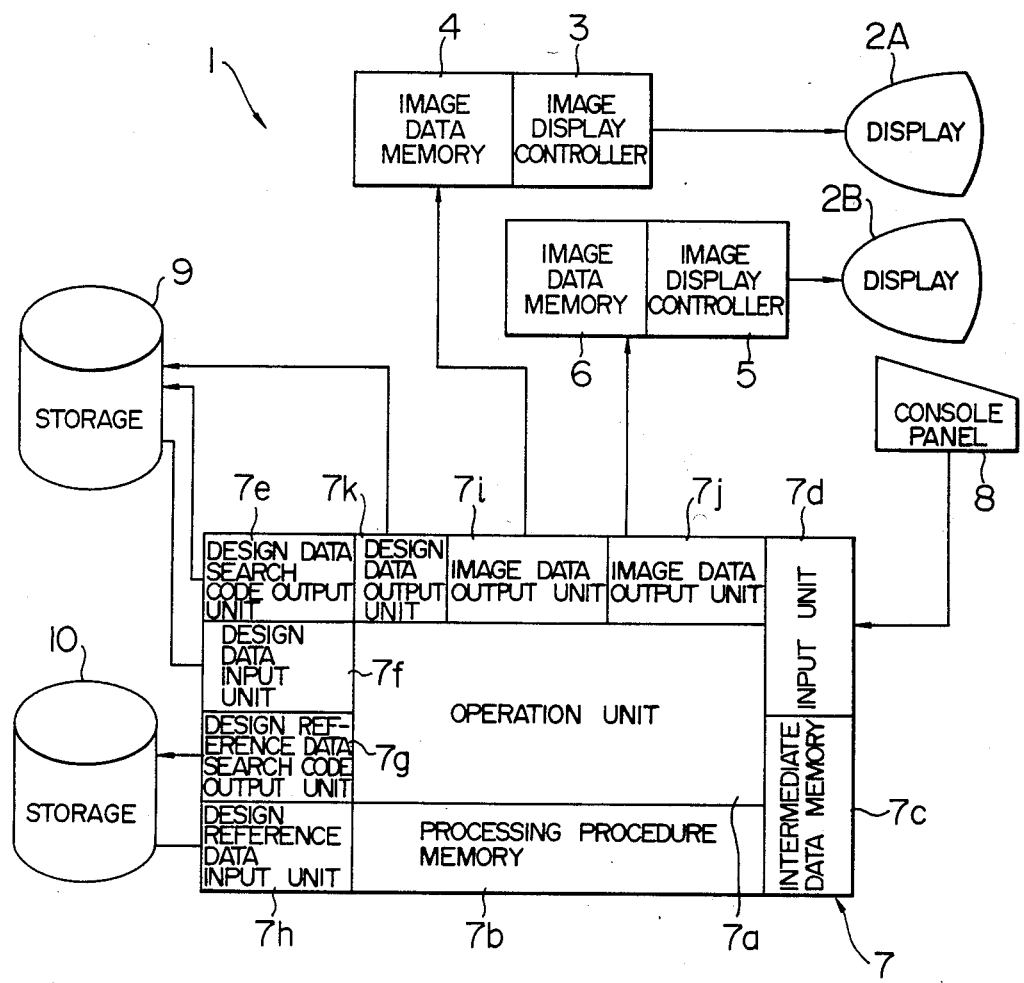
FIG. 1 shows a configuration of one embodiment of a design support apparatus of the present invention.

FIG. 1 shows one embodiment of the design support apparatus of the present invention. The design support apparatus 1 supports design of layout of devices and pipes in a plant, and comprises display units (CRT) 2A and 2B, image display controllers 3 and 5, a processor (for example, computer) 7, a console panel (for example, keyboard) 8 and external storages 9 and 10.

Figures 2, 3:
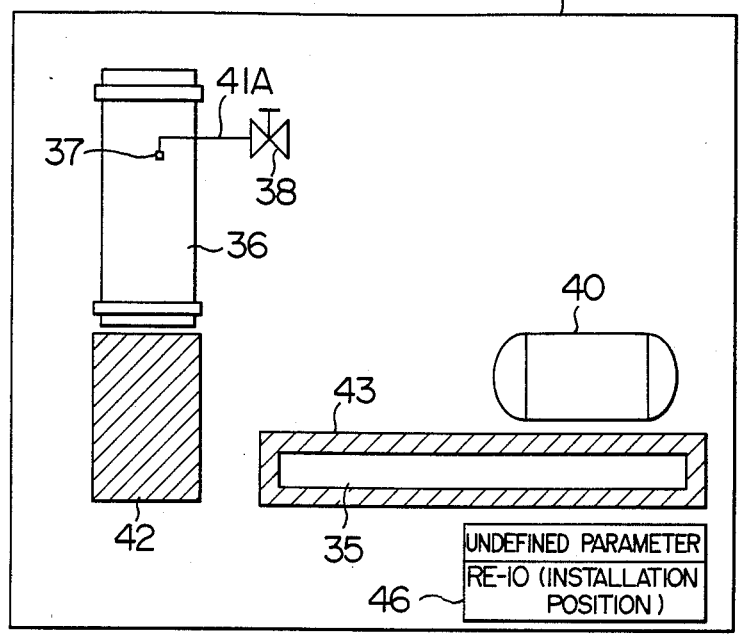
FIG. 2 shows an image in a course of design displayed on a screen of a display unit 2A of the apparatus of FIG. 1.
FIG. 3 shows design data of design object codes stored in an external storage 9 of the apparatus of FIG. 1, FIGS. 4, 5A, 5B, 5C and 5D show design data of part codes stored in the external storage 9 of the apparatus of FIG. 1, FIGS. 6A (and b), 6B (a and b) and 6C (a and b) show design reference data stored in an external storage 10 of the apparatus of FIG. 1.

An example of a display screen of the CRT 2A is shown in FIG. 2. It shows a step in the course of design in which an operator has entered design data on installation positions and sizes of devices 36, 37, 38 and 40 and a pipe 41A from the console panel 8. The display screen displays graphic patterns of parts such as those devices and pipes. It is noted that even devices or apparatuses in a plant are called "parts" in the specification. Hatched areas are restriction areas which are a feature of the present invention and will be described later. An area 46 displays devices and/or pipes whose installation positions the operator has not yet defined. This will also be explained later.

In FIG. 1, the image display controller 3 has an image data memory 4 and is connected to the display unit 2A. The image display controller 3 reads out image data stored in the image data memory 4, and drives the display unit 2A to display the read image data on the screen of the display unit 2A. The image display controller 5 has an image data memory 6 and is connected to the display unit 2B. The operation of the image display controller 5 is same as that of the image display controller 3. The processor 7 has an operation unit 7a, a processing procedure memory 7b, an intermediate data memory 7c, an input unit 7d, a design data search code output unit 7e, a design data input unit 7f, a design reference data search code output unit 7g, a design reference data input unit 7h, image data output units 7i and 7j and a design data output unit 7k. The processing procedure memory 7b stores therein a program for a processing procedure shown by flow charts of FIGS. 5-9. The console panel 8 is connected to the input unit 7d. The image data memories 4 and 6 are connected to the image data outputs 7i and 7j, respectively. The external storage 9 is a data base which contains plant design data and design data for devices and pipes in the plant, and it is connected to the design data search code output unit 7e and the design data input unit 7f. FIGS. 3, 4 and 5 show examples of the design data stored in the external memory 9. FIG. 3 shows design data on a system HD shown by a design object code or line code "HD9". The design data for other systems of the plant are also stored in the external storage 9. FIGS. 4 and 5 show examples of design data on the devices used in the system HD of FIG. 3, stored in the external storage 9. FIG. 4 shows the design data on a heat exchanger shown by a code "N21-B003A", and FIG. 5A shows the design data on a reducer shown by a part code "RE-10". The design data on the device shown in FIG. 4 is read out after the design data of the line code "HD9" of FIG. 3 have been read, in connection with the design data of the line code "HD9". The design data on the device shown in FIG. 5 is read out after the design data of FIG. 3 or FIG. 4 has been read, in connection with the design data of FIG. 3 or FIG. 4. The design data in the reducer shown by the part code "RE-10" contain no position data (X, Y, Z) (design parameters), because the operator has not yet entered the position of the reducer from the console panel 8 and the design parameters have not yet been defined. Thus, the plant is in the course of design and the installation position of the reducer (RE-10) has not yet been defined. FIG. 5B shows design data for a sluice valve shown by a part code "N21-F10". FIG. 5C shows design data for a tank shown by a part code "A-22", and FIG. 5D shows design data for a nozzle shown by a part code "N21-B003A-7".

The external storage 10 shown in FIG. 1 is a data base which stores therein various design reference data for the layout of the pipes of the plant and is connected to the design reference search code output unit 7g and the design reference data input unit 7h. FIGS. 6A to 6C show examples of the design reference data stored in the external storage 10. The design reference data Nos. 1, 2 and 3 each has data on a restriction item, the number of condition data, condition data, conclusion data and a design reference. The design reference data Nos. 1 and 3 relate to the system HD. The design reference data No. 2 relates to the reducer. The design reference data for other systems and devices of the plant are similarly stored.

Figure 7:
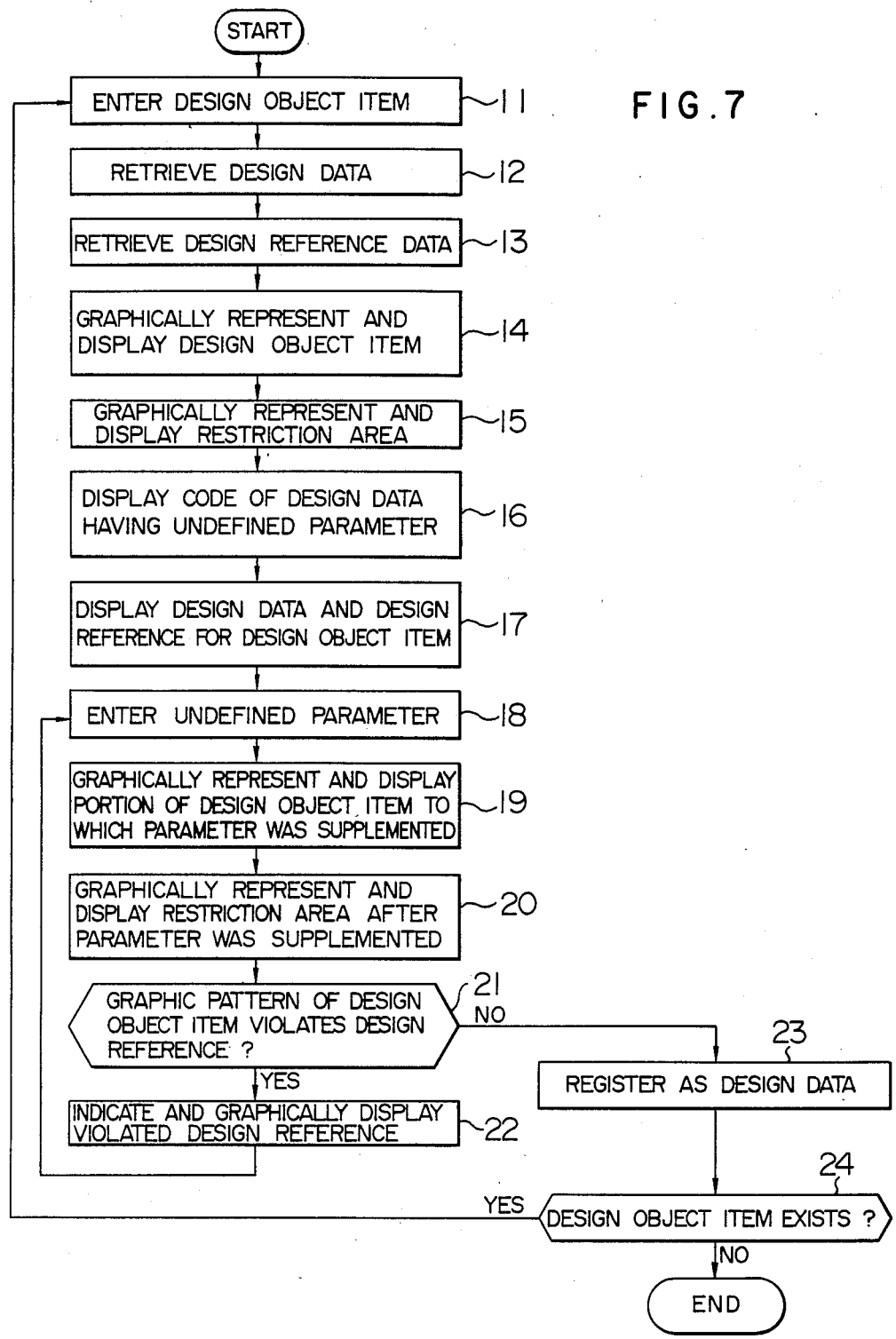
FIG. 7 shows a flow chart of a procedure to support design executed by the apparatus of FIG. 1, FIGS. 8A and 8B show memory areas in a processing procedure memory 7b and an intermediate data memory 7c of the apparatus of FIG. 1.

The processing procedure memory 7b shown in FIG. 1 stores therein steps 11 to 24 of the design support processing procedure program shown in FIG. 7.

An overall processing of the design support apparatus 1 of the present invention is explained with reference to the flow chart of FIG. 7.

An operator of the design support apparatus 1 manipulates the console panel 8 to enter a line code of the design object (design object item), for example, the line code "HD9" of the system HD, and a display form of a graphic pattern to be displayed on the display unit, to the processor 7 (step 11). The display form of the graphic pattern may be (1) display in accordance with a drafting method such as a three-plane method, (2) display in accordance with an isometrical projection method or (3) display in accordance with a perspection method. The design data of the line code for the design object and the design data of the related part codes are read from the external storage 9 by the operation unit 7a and stored in the design data input unit 7f (step 12). The design reference data for the design data stored in the design data input unit 7f is read out from the external storage 10 by the processor 7 and stored in the design reference data input unit 7h (step 13). The operation unit 7a causes the display unit 2A to display the graphic pattern of the design object item in the display form designated by the operator in the step 11, in accordance with the design data stored in the design data input unit 7f and the design reference data input unit 7h (step 14). Restriction areas derived from the device and parts such as pipes of the design object are displayed on the screen of the display unit 2A (step 15). If a part whose installation position has not yet been determined, that is, which has an undefined parameter is included at this stage, the design data of the part having the undefined parameter is displayed (step 16). The design references related to the design data of the part having the undefined parameter are displayed (step 17). The operator enters appropriate data for the undefined parameter while he/she takes the displayed restriction areas into account (step 18). A graphic pattern of the part having the undefined parameter is displayed on the display screen in accordance with the data entered by the operator (step 19). The restriction area for the part whose parameter was supplemented by the operator is displayed on the display screen (step 20). The operation unit 7a checks if any of the parts displayed on the screen is within the restriction area (step 21). If a part is within the restriction area, a comment indicating a violation to the design reference is displayed with the violated portion being highlighted, and the process returns to the step 18 (step 22). If the parts are not within the restriction area, the newly entered data are registered as the design data (step 23). The operation unit 7a checks whether there is another line code of the design object (step 24), and if there is, the process returns to the step 11 to repeat the design, and if there is no such line data, the design process is terminated.

Figure 8A:
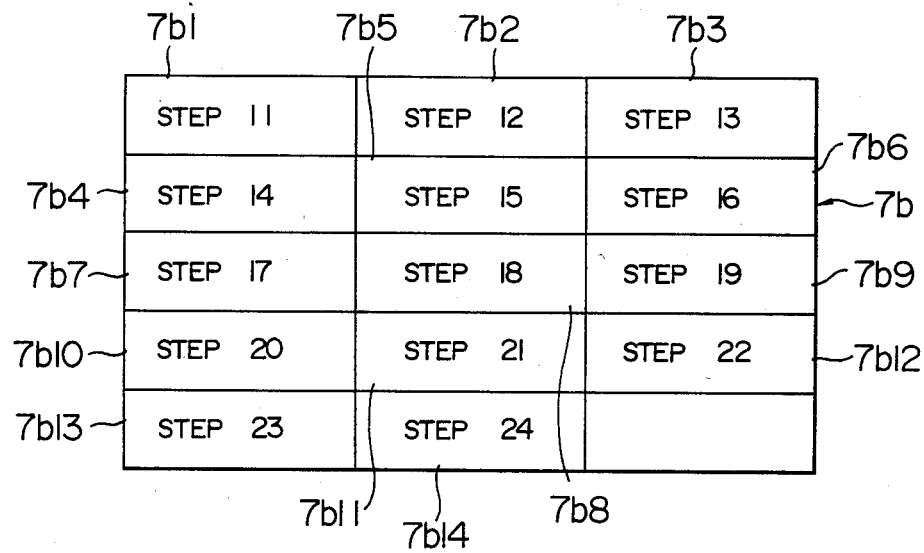
Figure 8B:
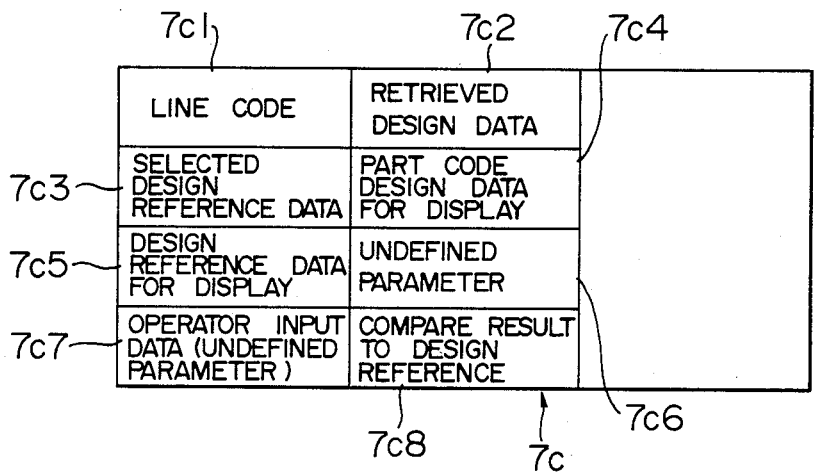

The above steps 11 to 24 are stored in predetermined address areas of the processing procedure memory 7b shown in FIG. 8A, that is, in the memories 7b1 to 7b14.

The steps of FIG. 7 are now explained in detail.

Figure 9:
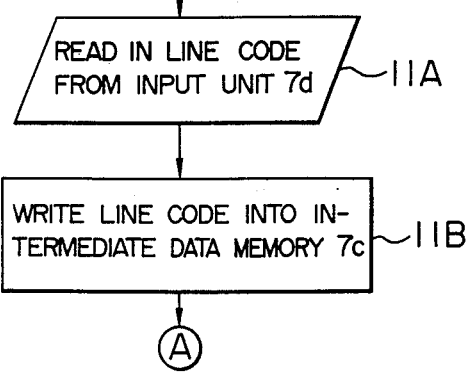
FIG. 9 shows a detailed flow chart of a step 7 of FIG. 7.

FIG. 9 illustrates the processing in the step 11 of FIG. 7. In a step 11A, the operator designates a design object item to which design is to be proceeded (for example, line code "HD9", through the console panel 8). The design object item entered by the operator is latched in the input unit 7d of the processor 7. In a step 11B, the operation unit 7a temporarily stores the design object item inputted to the input unit 7d to a predetermined memory area (design object item memory area) 7c1 of the intermediate data memory 7c.

Figure 10:
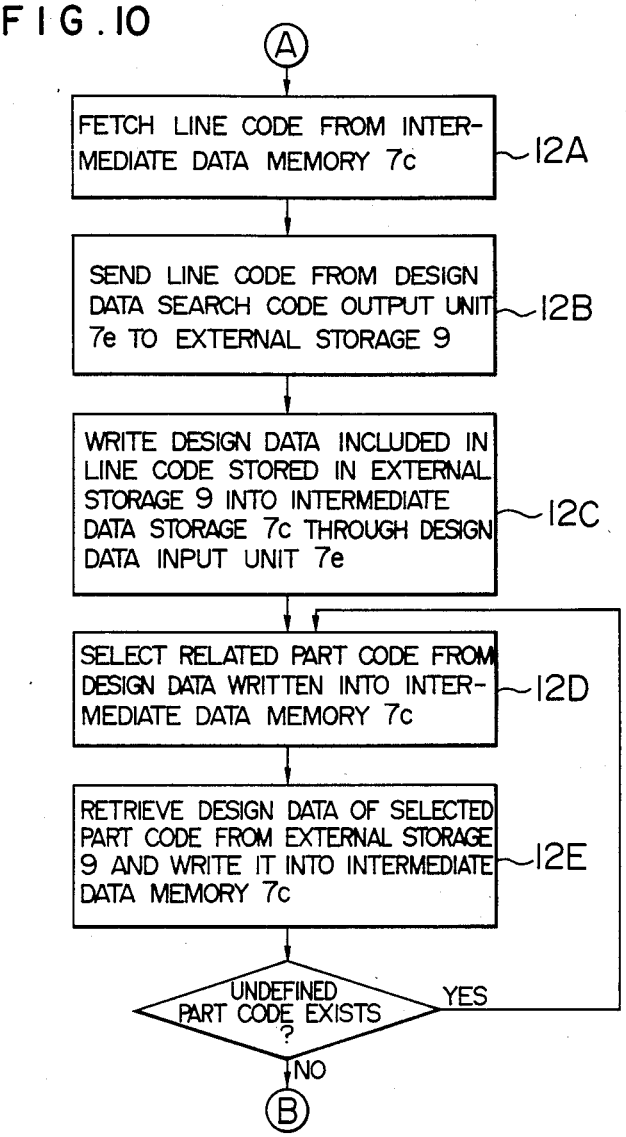
FIG. 10 shows a detailed flow chart of a step 12 of FIG. 7.

FIG. 10 illustrates the processing in the step 12 of FIG. 7. The design data handled in the step 12 (and the step 11) are stored in the memory areas 7c1-7c8 of the intermediate data memory 7c shown in FIG. 8B. The operation unit 7a reads out the line code "HD9" stored in the memory area 7c1 of the intermediate data memory 7c (step 12A). Then, the operation unit 7a sends the line code "HD9" to the external storage 9 through the design data search code output unit 7e (step 12B). The operation unit 7a retrieves the design data (shown in FIG. 3) of the design object item relating to the line code "HD9" from the design data stored in the external storage 9, reads the retrieved design data into the processor 7 through the design data input unit 7f and stores it into the memory area 7c2 (design data memory area) of the intermediate data memory 7c (step 12C). The operation unit 7a retrieves the part code (excluding the line code) from the design data for the line code "HD9" stored in the memory area 7c2 of the intermediate data memory 7c (step 12D). In the present example, in the step 12D, the part codes "A-22" (tank), "N-21-B003A" (heat exchanger), "RE-10" (intermediate device) and "N21-F10" (sluice valve) are retrieved from the design data of FIG. 3. In order to distinguish the code from non-code information in the design data, it is desirable to display the code in accordance with a certain rule. For example, the code may be defined as one which has an alphabetic character at the beginning and is represented by both alphabetic and numeric characters. The part code design data for the part codes retrieved from the design object item design data shown in FIG. 3 is read from the external storage 9 and is stored in the memory area 7c2 of the intermediate data memory 7c (step 12E). In the present example, the part code design data (shown in FIGS. 4, 5A, 5B and 5C) for the part codes "A-22", "N21-B003A", "RE-10" and "N21-F10" shown in FIG. 3 are retrieved and stored into the memory area 7c2 of the intermediate data memory 7c.

The steps 12D, 12E and 12F are repeated until the part codes in the design data retrieved within the range of the design object item are exhausted. In the step 12F, the presence or absence of the part code which is stored in the predetermined memory area of the intermediate data memory 7c and for which the design data has not yet been retrieved is checked. If there is a part code for which the design data has not yet been retrieved, the processing of the steps 12D and 12E is performed. This processing is repeated until the design data for the design object item stored in the step 12C and the design data for the part codes stored in the step 12E are exhausted. In the present example, the part code "N21-B003A-7" (nozzle) is included in the design data (FIG. 4) for "N21-B003A" (heat exchanger) stored in the intermediate data memory, and it is retrieved again in the step 12D. In the step 12E, the design data (FIG. 5D) for that part code is retrieved from the external storage 9 and stored into the memory area 7c2 of the intermediate data memory 7c. The part code "N21-B003A-8" is included in the design data for "N21-B003A" (heat exchanger), but since the part code is included in a system other than the system HD, this fact is detected in the step 12F and no processing is carried out in the steps 12D and 12E. In the step 12F, when it is determined that the part codes included in the design data stored in the memory area 7c2 of the intermediate data memory 7c within the range of the design object item (line code), the process goes to the step 13 shown in FIG. 7.

Figure 11:
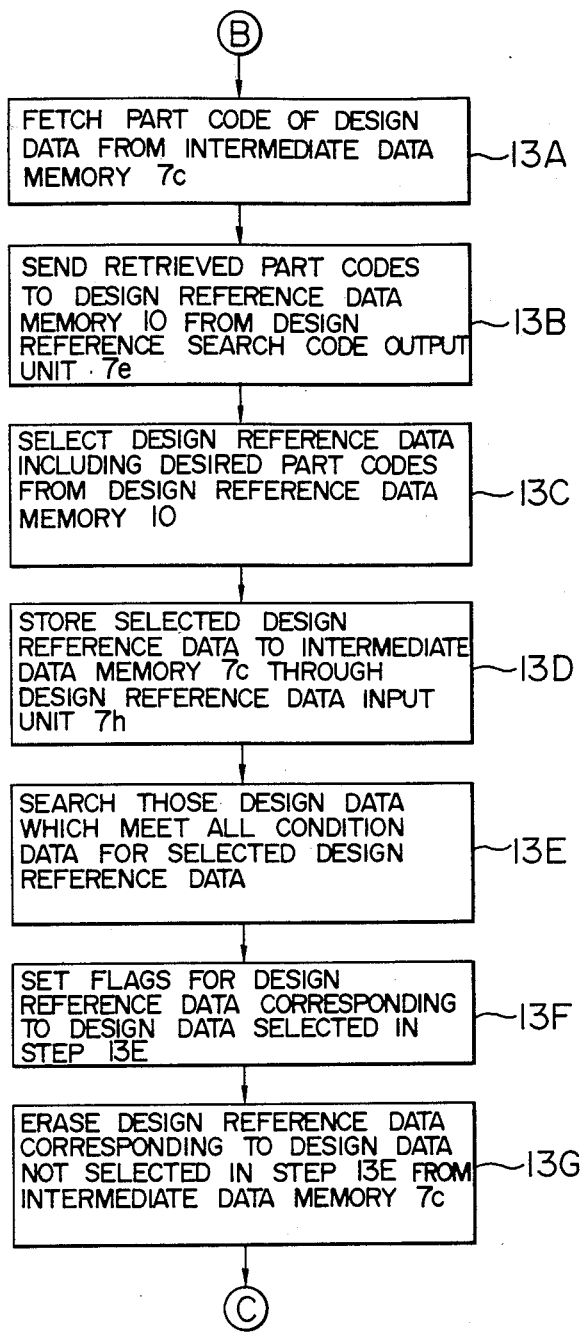
FIG. 11 shows a detailed flow chart of a step 13 of FIG. 7, FIGS. 12A, 12B, 12C and 12D show detailed flow charts for steps 14 and 19 of FIG. 7, FIGS. 13A, 13B, 13C and 13D show detailed flow charts of steps 15 and 20 of FIG. 7.

The processing of the step 13 (retrieval of the design reference data) carried out by the operation unit 7a comprises seven steps 13A-13G shown in FIG. 11. Those steps 13A-13G are sequentially carried out. In the step 13 of FIG. 7, the desired design reference data is written into the predetermined memory area (design reference data memory area) of the intermediate data memory 7c from the design reference data memory 10, by referencing the design data stored in the step 12 in the design data memory area of the intermediate data memory 7c. First, the system of the design data and the part codes ("HD9", "A-22", "N21-B003A", "N21-F10", "RE-10", ----- ) stored in the step 12 in the memory area 7c2 of the intermediate data memory 7c are read out (step 13A). The part codes are then sent from the design reference data search code output unit 7g to the design reference data memory 10 (step 13B). The design reference data which includes the desired line code or any of the desired part codes is selected from the design reference data stored in the design reference data memory 10 (step 13C). In the step 13C, the numbers 1-3 of FIGS. 6A-6C and other related design reference data are selected. The design reference data numbers selected, the restriction items, the number of condition data, the condition data, conclusion data and the design references are stored in the predetermined memory area (design reference data memory area) of the intermediate data memory 7c through the design reference data input unit 7h (step 13D). Those selected design reference data are checked for the part code design data which satisfies all of the conditions in the condition data column (step 13E), and if there is such a design reference data, a flag is set for that design reference data to indicate that the conditions are met (step 13F). For example, for the design reference data No. 1 shown in FIG. 6, the line code and part codes which have three items, class of condition data, temperature and system and the items relate to pipe, high temperature and HD, respectively (which part codes are stored in the design data memory area 7c2 of the intermediate data memory 7c) are searched. If there is design data for the line code or part code which satisfies the conditions of the three items, the code of the corresponding design data is entered to the code name column of the conclusion data for the design reference data No. 1. For the design reference data No. 1 of FIG. 6A, the contents of the three items of the condition data are equal to the contents of the items, i.e. class of the line code "HD9", temperature and system shown in FIG. 2. Thus, "HD9" is entered as the code name for the conclusion data to the design reference data No. 1. For the design reference data No. 3, the contents of the three items of the condition data are equal to the contents of the items, i.e. class of line code "HD9", system and diameter shown in FIG. 2. Thus, "HD9" is entered as the code name of the conclusion data. For the design reference data No. 2, the contents of the two items of the condition data are equal to the contents of the items, i.e. class of part code "RE-10" and type shown in FIG. 5A. Thus, "RE-10" is entered as the code name of the conclusion data. For the system HD which is the design object item under consideration, the design reference data Nos. 1-3 having the codes entered in the code name columns of the conclusion data are prepared. The flag set operation in the step 13F may be substituted by entering the code name into the code name column of the conclusion data.

In the last step 13G of the step 13, only those design reference data which meet the condition are left in the memory area 7c3 of the intermediate data memory 7c, and the those design reference data in the memory area 7c3 which do not meet the conditions are erased. In the present example, the design reference data other than Nos. 1-3 shown in FIGS. 6A, 6B and 6C are erased from the memory area 7c3.

After the processing of the step 13 shown in FIG. 11, the operation unit 7a carries out the processing of the step 14. The step 14 performs graphic representation and display of the structure of the design object item, and comprises steps 14A, 14B, $14C_1$–$14R_1$, $14C_2$–$14J_2$ and $14C_3$–$14J_3$ shown in FIGS. 12A–12D.

Figure 12A:
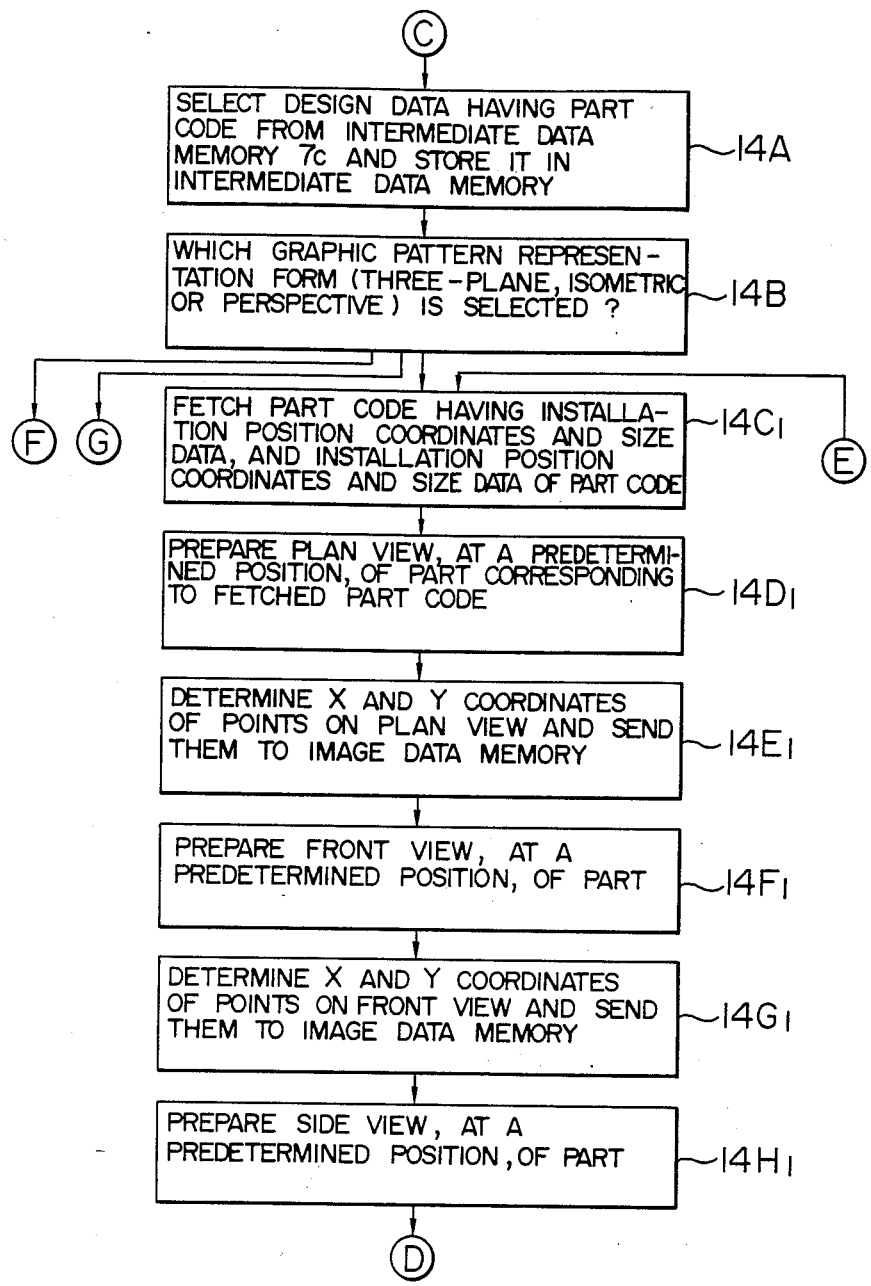

In FIG. 12A, those design data which have part codes are selected from the design data stored in the memory area 7c2 of the intermediate data memory 7c (step 14A). Thus, part codes "N21-B003A", "N21-F10", "RE-10", "A-22" and "N21-B003A-7" are selected. The design data included in the selected part codes are stored in a new memory area 7c4 of the intermediate data memory 7c. A step 14B selects a graphic representation form, that is, one of (1) three-plane method, (2) isometrical projection method and (3) perspection method in accordance with with a graphic representation form select signal (stored in the intermediate data memory 7c) entered by the operator in the step 11 through the console panel 8. In the present example, the graphic representation form is selected by the operator in the step 11, although it may be selected in the step 14B. In the present example, the representation by the three-plane method is selected in accordance with the input signal. When it is selected, the processing of steps $14C_1$–$14R_1$ is carried out. Of the design data having the part codes selected and stored in the memory area 7c4, the part codes whose data on the installation position parameter and the size parameter have been determined, and the installation positions and the sizes relating to those part codes are read out (step $14C_1$). In the present example, in the step $14C_1$, the part codes "N21-B003A", "NF21-F10", "A22" and "N21-B003A-7" having their parameters determined are selected, and the installation positions of the part codes and the sizes are read out. The size for "N21-F10" is a diameter, and "N21-B003A-7" has only the installation position shown in FIG. 5D although the size thereof is stored. A plan view of the devices is prepared on the basis of the installation position and the size data of the fetched code (step $14D_1$). More specifically, X and Y coordinates of a number of points which constitute lines in the plan view are determined based on the X and Y installation position coordinates and the size data of the devices. The resulting X and Y coordinates of the points constituting the lines in the plan view are sent from the image data output unit 7i (FIG. 1) to the image data memory 4 (step $14E_1$). The X and Y coordinates of the plan view of the device determined in the step $14D_1$ are stored in the image data memory 4 of FIG. 1. A plan view arranged at a predetermined position of the device is prepared based on the installation position coordinates and the size data (step $14F_1$). X and Z coordinates of a number of points constituting lines in a front view are determined based on the X and Z installation position coordinates and the size data of the device. In a step $14G_1$, the X and Z coordinates of the points constituting the lines are sent from the image data output unit 7i to the image data memory 4. The image data memory 4 stores the X and Z coordinates of those points. Finally, a side view arranged at a predetermined position of the device is prepared based on the installation position coordinates and the size data (step $14H_1$).

Figure 12B:
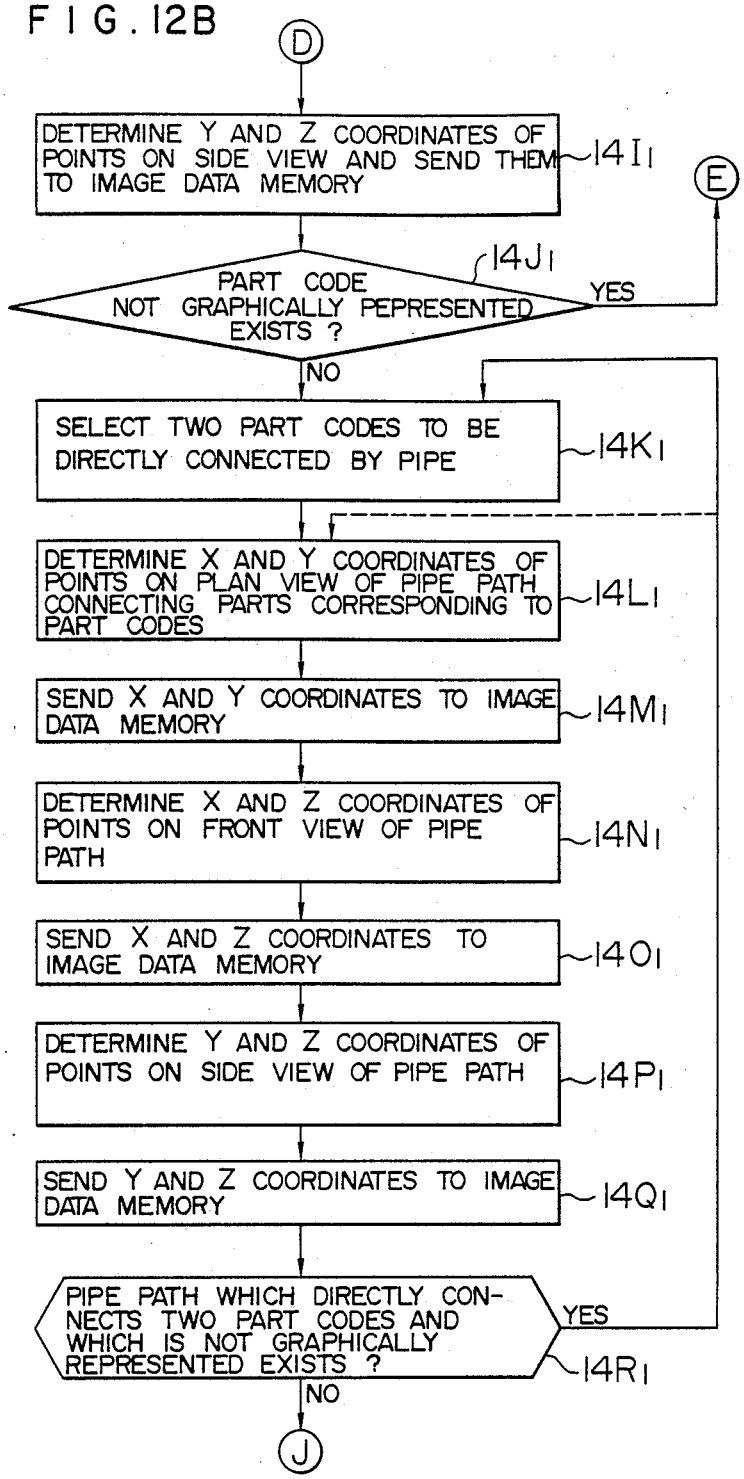

FIG. 12B shows a continued portion to the flow chart of FIG. 12A. In a step $14H_1$, the Y and Z coordinates of a number of lines which constitute the side view are determined based on the Y and Z installation position coordinates and the size data of the device. The Y and Z coordinates of the points constituting the lines are sent from the image data output unit 7i to the image data memory 4 (step $14I_1$). The Y and Z coordinates of those points are stored in the image data memory 4.

After the step $14I_1$, the presence or absence of the part code which has both the installation position coordinate and the size data but is not graphically represented is checked (step $14J_1$). If there is such a part code, the steps $14C_1$–$14J_1$ are repeated. In the present example, the part codes "A-22", "N21-F10", "N21-B003A" and "N21-B003A-7" are graphically displayed on the screen by the three-plane method. "RE-10" has the size already set although it is not shown in FIG. 5A. The installation position for "RE-10" has not yet been set by the operator. Accordingly, "RE-10" is not pertinent to the decision in the step $14J_1$ and it is not selected in the step $14C_1$ and not graphically displayed on the screen. In the step $14J_1$, if there is no part code which has the installation position coordinate and the size data and is not graphically represented, the process goes to a step $14K_1$. The two part codes of the part codes stored in the memory area 7c4 which are to be directly connected to the pipe in the sequence of pipes (see the item of pipe connection in FIG. 3) are stored in the memory area 7c2. In the present example, the part codes "N21-B003A-7" and "N21-F10" are selected. The X and Y coordinates of a number of points which constitute lines in the plan view of the pipe paths by which the objects designated by the two selected part codes are connected are determined (step $14L_1$ ). The pipe paths may be determined by a method disclosed in Japanese Patent Application No. 58-187033 (corres. to Japanese Patent Unexamined Publication No. 60-79470). Alternatively, the design data of the related pipes stored in the external storage 9 are selected from the part codes of the two parts to be directly connected, and the X and Y coordinates of the pipes are determined based on the selected design data. The X and Y coordinates of the points constituting the lines of the pipe paths are sent from the image data output unit 7i to the image data memory 4 (step $14M_1$). Those coordinates are stored in the image data memory 4. The X and Z coordinates of a number of points which constitute lines of the pipe paths in a front view are determined (step $14N_1$). The resulting X and Z coordinates are sent from the image data output unit 7i to the image data memory 4 (step $14O_1$). Those coordinates are stored in the image data memory 4. The Y and Z coordinates of a number of points which constitute lines of the pipe paths in the side view are determined (step 14P$_1$). Those coordinates are sent from the image data output unit 7*i* to the image data memory 4 (step 14Q$_1$) and stored therein. The presence or absence of the pipe path which directly connects the two part codes and which has not yet been graphically represented is checked (step 14R$_1$). If there is such a pipe path, the steps 14K$_1$–14R$_1$ are repeated. If all combinations of two part codes connected by the pipes are selected in the step 14K$_1$, the process returns to the step 14L$_1$ from the step 14R$_1$ as shown by a broken line and repeats the steps 14L$_1$–14R$_1$. In the step 14R$_1$, if there is no such pipe path, the process goes to a step 15A which will be explained later. In this manner, the structures of the part codes having the installation positions and sizes determined and the pipe path which directly connects those two part codes are graphically represented.

Figure 13A:
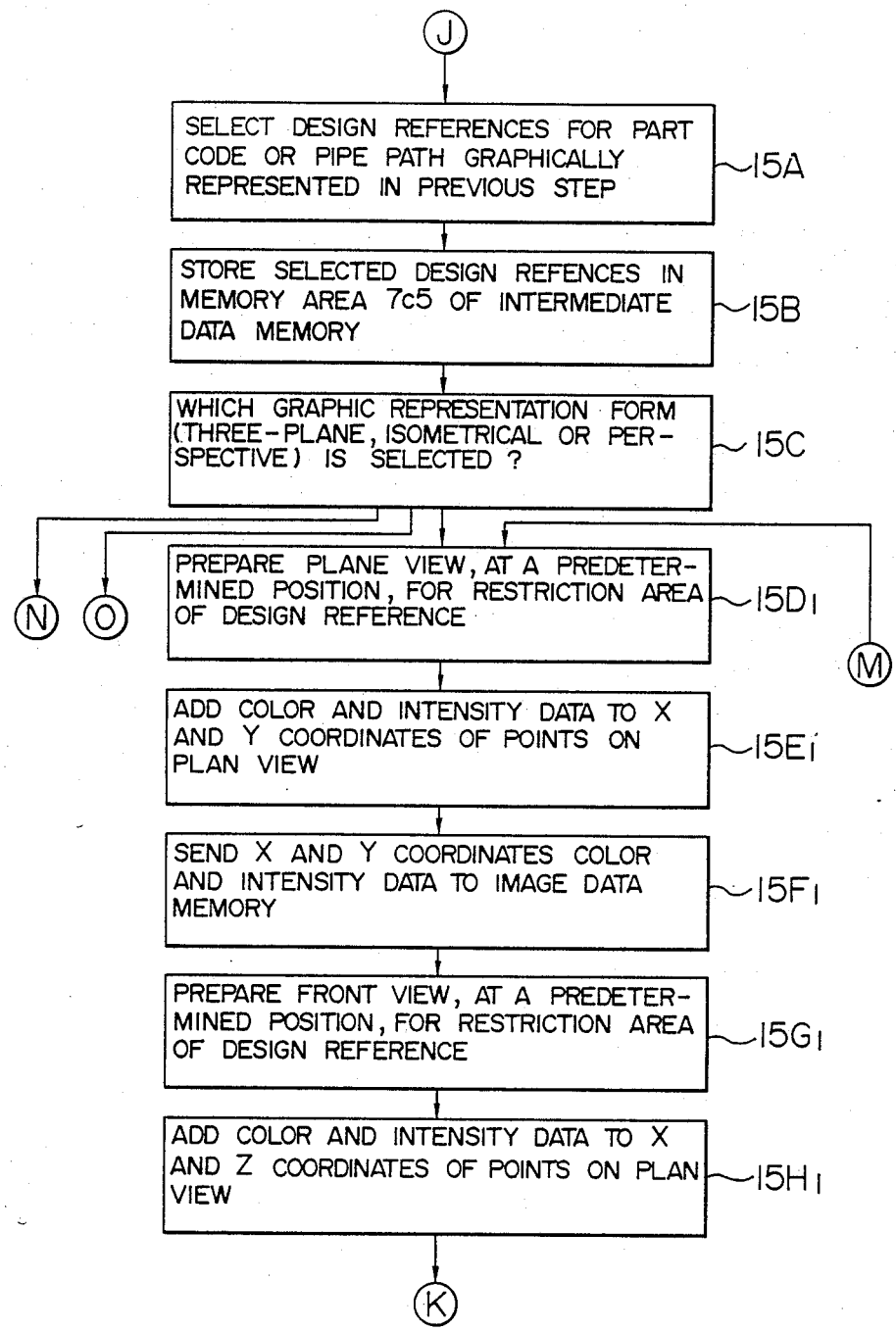

The graphic pattern representation by the three-plane method has been described. The graphic pattern representation by the isometrical method is now explained. In the isometrical projection drawing, three orthogonal axes are projected to three axes angularly spaced by 120° from each other. If the selection of the isometric method is detected in the step 14B, the processing of steps 14C$_2$–14J$_2$ is carried out. The part code having both of the installation position coordinates and the size data, and the installation position coordinates and the size data for the part code are read from the design data having the part codes, selected and stored in the memory 7*c*4 (step 14C$_2$). An isometric view arranged at a predetermined position of the device is prepared based on the installation position coordinates and the size data of the part code (step 14D$_2$). X, Y and Z coordinates of a number of points which constitute lines of patterns are determined based on the X, Y and Z installation position coordinates and the size data of the device. The resulting X, Y and Z coordinates of the points constituting the lines of patterns are sent from the image data output unit 7*i* to the image data memory 4 (step 14E$_2$). The X, Y and Z coordinates are stored in the image data memory 4. After the step 14E$_2$, the presence or absence of the part code which has the installation position coordinate and the size data and which is not graphically represented is checked (step 14F$_2$). As described above, since "RE-10" has no installation position data, it is not selected in the step 14F$_2$. If the there is such a part code, the steps 14C$_2$–14F$_2$ are repeated. If there is no such part code in the step 14F$_2$, the process goes to a step 14G$_2$. Of the codes stored in the memory 7*c*4, the two part codes which are to be directly connected by the pipe in the sequence of pipes (see FIG. 3) stored in the memory 7*c*2 are selected. The X, Y and Z coordinates of a number of points which constitute lines in the isometric view of the pipe paths which connect the objects designated by the two selected part codes are determined (step 14H$_2$). The resulting X, Y and Z coordinates of the points constituting the lines of the pipe paths are sent from the image data output unit 7*i* to the image data memory 4 (step 14I$_2$). Those coordinates are stored in the image data memory 4. Finally, the presence or absence of the pipe path which directly connects the two part codes and which is not graphically represented is determined (step 14J$_2$). If there is such a pipe path, the steps 14G$_2$–14J$_2$ are repeated. If there is no such pipe path in the step 14J$_2$, the process goes to the step 15A shown in FIG. 13A.

If a signal to select the perspective method is entered from the console panel 8, the selection of the perspective method is detected in the step 14B (FIG. 12A) and the steps 14C$_3$–14J$_3$ shown in FIG. 12D are carried out. The processing of the steps 14C$_3$–14J$_3$ are essentially identical to the processing of the steps 14C$_2$–14J$_2$ with substitution of "isometrical view" in the steps 14D$_2$, 14E$_2$ and 14H$_2$ with "perspective view." If the presence of the pipe path is detected in the step 14J$_3$, the process goes to the step 14C$_3$, and if the absence thereof is detected, the process goes to the step 15A shown in FIG. 13A. In the perspective view, an object is drawn by a perspective method as viewed from a one view point in the same manner as that human beings view.

After the step 14 to graphically represent the structure of the design object item, the operation unit 7*a* carries out the step 15 shown in FIG. 7. In the step 15, the structure of the part codes having the installation positions and the sizes thereof defined and the restriction area for the pipe path which directly connects those two part codes are graphically represented and displayed. The step 15 comprises steps 15A–15C, 15D$_1$–15M$_1$, 15D$_2$–15G$_2$ and 15D$_3$–15G$_3$ as shown in FIGS. 13A–13D.

All design references relating to the graphically represented part codes or pipe path of the step 14 are selected from the memory area 7*c*3 of the intermediate data memory 7*c* (step 15A). All selected design references are stored in the address area 7*c*5 of the intermediate data memory 7*c* (step 15B). In the present example, the design references relating to the design reference data Nos. 1 and 3 shown in FIGS. 6A–6C are selected. The graphic pattern representation form, that is, one of (1) three-plane method, (2) isometrical method and (3) perspecive method is determined in accordance with the graphic pattern representation form select signal entered from the console panel 8 (step 15C). In the present example, the three-plane method is selected.

As the three-plane method is selected in the step 15C, the steps 15D$_1$–15M$_1$ are carried out. In the step 15B, a plane view of a restriction area (inhibit area) for one design reference stored in the memory 7*c*5 is prepared based on the position of the restriction area and the size data thereof (step 15D$_1$). In the present example, the plan view of the restriction area of the design reference No. 1 shown in FIG. 6A, that is, a device take-out space is prepared. The installation position and the size data of the device take-out space are contained in the design reference data No. 1 although they are not shown in FIG. 6A. The installation position of the device take-out space for No. 1 is defined in connection with the part code "N21-B0003A" (heat exchanger). The preparation of the plan view is designed to determine X and Y coordinates of a number of points which constitute lines in the plan view of the restriction area. Thus, the plan view of the device take-out space is prepared. In the step 15E$_1$, data for designating colors and intensities are added to the X and Y coordinates of the points which constitute the lines of the plan view of the restriction area (device take-out space). The colors are different from colors of the structures of the devices having codes and the pipe paths. In the present example, the restriction area is displayed in yellow. The data for designating the X and Y coordinates, colors and intensities are sent from the image data output unit 7*i* to the image data memory 4 (step 15F$_1$). The X and Y coordinates of the plan view of the restriction area determined in the step 15D$_1$ and the color and intensity data added in the step 15E$_1$ are stored in the image data memory 4. A front view arranged at a predetermined position of the restriction area (device take-out space) is next prepared based on the installation position coordinates and the size data (step 15G$_1$). The X and Z coordinates of a number of points which constitute lines in the front view are determined based on the X and Z installation position coordinates of the restriction data and the size data thereof. In the step 15H$_1$, the data to designate the colors (e.g. yellow) and the intensities are added to the X and Z coordinates of the points which constitute the lines of the front view of the restriction area. The data for designating the X and Z coordinates, colors and intensities of those points are sent from the image data output unit 7$i$ to the image data memory 4 (step 15I$_1$). The image data memory 4 stores the data for designating the X and Z coordinates, colors and intensities of those points. Finally, a side view arranged at a predetermined position of the restriction area is prepared based on the installation position coordinates and the size data (step 15J$_1$). In the step 15J$_1$, the Y and Z coordinates of a number of points which constitute lines in the side view are determined based on the Y and Z installation position coordinates of the restriction area and the size data thereof. Data for designating colors (e.g. yellow) and intensities are added to the Y and Z coordinates of the points which constitute the lines (step 15K$_1$). The data for designating the Y and Z coordinates, colors and intensities of the points are sent from the image data output unit 7$i$ to the image data memory 4 (step 15L$_1$). The Y and Z coordinates of those points are stored in the image data memory 4.

After the step 15L$_1$, the presence or absence of the design reference including the restriction area of the design reference which was stored in the step 15B in the memory area 7$c$5 and which is not graphically represented is checked (step 15M$_1$). If there is such a design reference, the steps 15D$_1$-15M$_1$ are repeated. In the present example, there is design reference No. 3 shown in FIG. 6C, for which the processing of the steps 15D$_1$-15M$_1$ is carried out again. The design reference No. 3 shown in FIG. 6C defines the restriction area with relation to a wall of the area in which the design object item is arranged. The coordinates of the points which constitute lines of the pattern of the wall are determined by the processor 7 prior to the start of the processing of the step 11 of FIG. 7 and stored in the image data memory 4. Accordingly, the restriction area for the design reference No. 3 of FIG. 6C is graphically represented in the plan view, front view and side view based on the size data "space from the wall not less than 300 mm" and "installation position of the wall". The coordinates of the points which constitute the lines of the patterns are sent to the image data memory 4 and stored therein.

Figure 14:
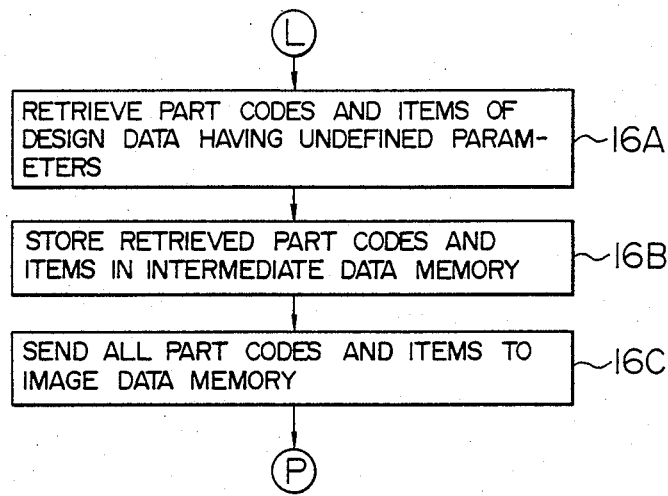
FIG. 14 shows a detailed flow chart of a step 16 of FIG. 7.

In the step 15M$_1$, if the absence of the design reference which includes the non-graphically represented restriction area is detected, the process goes to the step 16A shown in FIG. 14.

If the isometrical method is selected in the step 15C, the steps 15D$_2$-15G$_2$ shown in FIG. 13 are carried out. An isometrical view arranged at a predetermined position of the restriction area of one of the design references stored in the step 15B in the memory area 7$c$5 is prepared based on the installation position coordinate of the restriction area and the size data thereof (step 15D$_2$). The X, Y and Z coordinates of a number of points which constitute lines of patterns are determined based on the X, Y and Z installation position coordinates of the restriction area and the size data thereof. Data for designating colors (e.g. yellow) and intensities are added to the X, Y and Z coordinates of the points which constitute the lines of the patterns (step 15E$_2$). The data for designating the X, Y and Z coordinates, colors and intensities are sent from the image data output unit 7$i$ to the image data memory 4 (step 15F$_2$). The X, Y and Z coordinates sent in the step 15F$_2$ are stored in the image data memory 4. After the step 15F$_2$, the presence or absence of the design reference including the non-graphically represented restriction area of the design reference stored in the step 15B in the memory area 7$c$5 is checked (step 15G$_2$). If there is such a design reference, the processing of the steps 15D$_2$-15G$_2$ is repeated. If the absence of such design reference is detected in the step 15G$_2$, the step 16A is carried out.

Figure 13B:
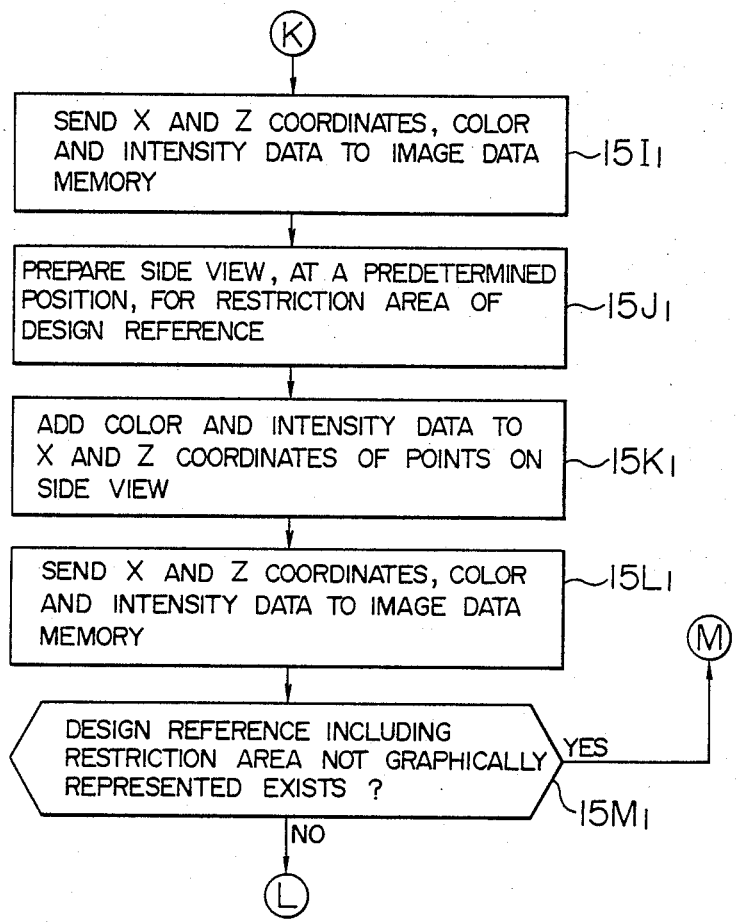
Figure 13C:
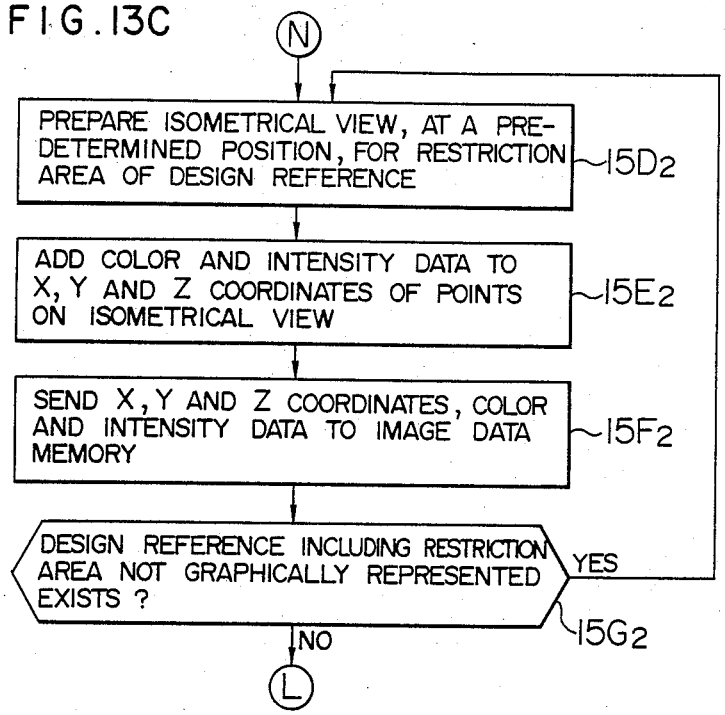
Figure 13D:
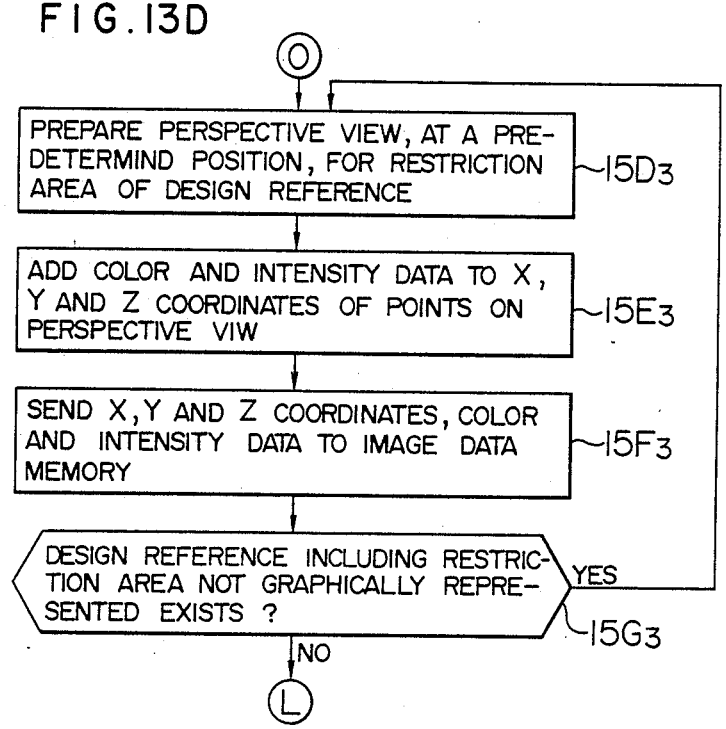

If a signal to select the perspective method is entered from the console panel 8, the perspective method is selected in the step 15C (FIG. 13A) and the steps 15D$_3$-15G$_3$ shown in FIG. 13D are carried out. The processing of the steps 15D$_3$-15G$_3$ is shown in FIG. 12D. Those steps are essentially identical to the steps 15D$_2$-15G$_2$ of FIG. 13C with substitution of "isometrical view" in the step 15D$_2$ by "perspective view". If the presence of the design reference which includes the restriction area in detected in the step 15G$_3$, the step 15D$_3$ is carried out, and if the absence of such design reference is detected, the step 16A shown in FIG. 14 is carried out.

The data for designating colors and intensities are added to the coordinates of the points of the patterns represented in the three-plane method, isometrical method or perspective method of the step 14, and the coordinates are sent to the image data memory.

After the step 15, the operation unit 7$a$ carries out the step 16, that is, displays the design data having and undefined parameter. The step 16 comprises steps 16A, 16B and 16C as shown in FIG. 14. The part code of the design data having the undefined parameters (e.g. installation position coordinate and size data) and the item (installation position and size) of the undefined parameters are retrieved from the design data stored in the memory area 7$c$2 of the intermediate data memory 7$c$ (step 16A). The part codes and the items of the undefined parameters are stored in the memory area 7$c$6 of the intermediate data memory 7$c$ (step 16B). In the present example, "RE-10" and the item "installation position" of the undefined parameter are stored in the memory 7$c$6. While the size of "RE-10" is not shown in FIG. 5A, it is stored in the external storage as the design data. In the step 16C, all of the part codes stored in the memory area 7$c$6 and the items of the undefined parameters therefor are sent from the image data output unit 7$i$ to the image data memory 4. Those part codes are stored in the image data memory 4.

Figure 15:
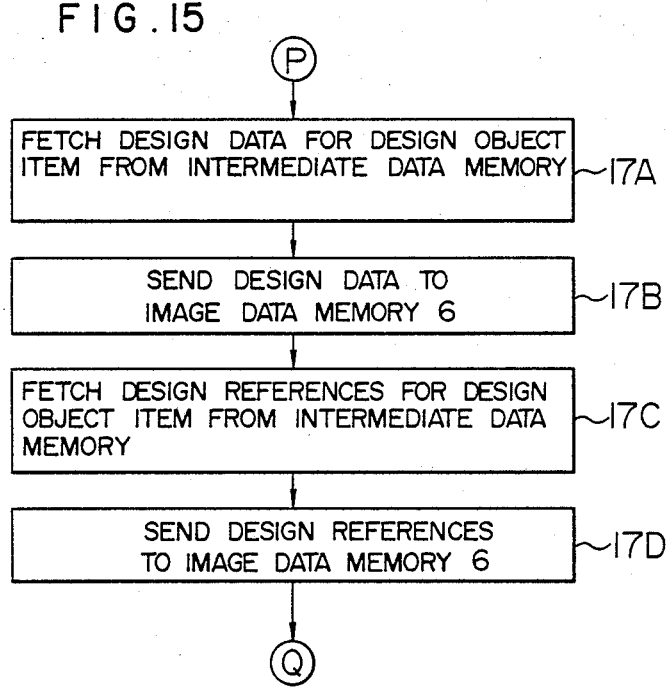
FIG. 15 shows a detailed flow chart of a step 17 of FIG. 7.

FIG. 15 shows a detail of the step 17 shown in FIG. 7. The step 17 comprises steps 17A-17D and displays the design data and design references to the design object item. After the step 16, the operation unit 7$a$ carries out the step 17. In the step 17A, the design data of the design object item stored in the memory area 7$c$2 of the intermediate data memory 7$c$ is read out. The design data is then sent from the image data output unit 7$j$ to the image data memory 6 (step 17B). In the present embodiment, the design data of the pipe system for the line code "HD9" (FIG. 3) is sent to the image data memory 6 in the step 17B. The image data memory 6 stores the design data of the design object item. Then, the design references for the design object item stored in the memory area 7$c$3 of the intermediate data memory 7c are read out (step 17C). The design references are then sent from the image data output unit 7j to the image data memory 6 (step 17D). The image data memory 6 stores the design references for the design object item. In the present example, the design reference Nos. 1–3 shown in FIGS. 6A–6C are sent from the image data output unit 7j to the image data memory 6 in the step 17D.

The image display controller 3 of FIG. 1 fetches the data for storing the coordinates, colors and intensities of the images stored in the image data memory 4 in the steps 14–16, and sequentially displays those images on the display device 2A. FIG. 2 shows an example of the display on the display device 2A displayed after the steps 14–16. It is a plan view of the design object item (system HD) derived in the steps 14 and 15. The heat exchanger (part code N21-B003A) 36 having the nozzle (part code N21-B003A-7) 37, sluice valve (part code N21-F10) 38, tank (part code A-22) 40 and pipe 41A which connects the nozzle 37 to the sluice valve 38 are graphically displayed. The graphic patterns of the heat exchanger 36, nozzle 37, sluice valve 38 and tank 40 are derived in the steps $14C_1$–$14E_1$. The graphic pattern of the pipe 41A is derived in the steps $14L_1$–$14Q_1$. Numeral 35 denotes a wall located in a section in which the devices are arranged. The graphic pattern of the wall 35 is previously determined and stored in the image data memory 4. The restriction area 42 is for the design reference No. 1 shown in FIG. 6A. The restriction area 43 is for the design reference No. 3 shown in FIG. 6C. Those restriction areas are determined in the steps $15D_1$–$15F_1$. The undefined parameter 46 is determined in the steps 16A–16C.

In the step 17, the image display controller 5 of FIG. 1 fetches the data for designating the coordinates, colors and intensities of the images stored in the image data memory 6 and displays the images on the display device 2B. FIG. 17 shows an example of display of the design data and design references derived in the steps 17A–17D.

Then, the operator enters from the console panel 8 the data for the item of the undefined parameter of the device designated by the part code including the undefined parameter in the image (FIG. 2) displayed on the display device 2A, together with the part codes. Since the part codes such as devices which include the undefined parameters and the items of the undefined parameters are displayed on the display device 2A, the operator can easily recognize the devices which include the undefined parameters and the items of the undefined parameters so that he/she can enter the required data in a short time. "RE-10 (installation position)" is displayed in the column of the undefined parameter of the image shown in FIG. 2. Thus, the operator enters the X, Y and Z coordinates of the installation position of the reducer (RE-10) together with the part code "RE-10" from the console panel 8. Since the restriction areas 42 and 43 are displayed on the display device 2A, the operator can enter the installation position of the reducer in a short time such that it does not go into the restriction areas 42 and 43 and it meets the design references 2 displayed on the display device 2B.

Since the design data and the design reference are displayed on the screen (FIG. 16) of the display device 2B, the operator can very easily position the parts for the part codes which include the undefined parameters such that they meet the design references. Thus, the design time can be shortened.

After the step 17, the operation unit 7a carries out the step 18 shown in FIG. 7 (entry of data of undefined parameter of design data). As shown in FIG. 17, the step 18 comprises steps 18A and 18B. As described above, the data for the part codes which include the undefined parameters and the items of the corresponding undefined parameters, which were entered by the operator, are fetched into the processor 7 through the input unit 7d (step 18A). The data for the part codes and the items of the undefined parameters are stored in the memory area 7c7 of the intermediate data memory 7c (step 18B).

The operation unit 7a of FIG. 1 then carries out the step 19, that is, graphic representation and display of the objects to which the parameters were supplemented and the pipe path to be connected thereto. The step 19 is similar to the processing shown in FIGS. 12A–12D, which are referenced here.

The operation unit 7a first determines the selection of the graphic representation form in the step 14B. That is, the graphic representation form selected by the operator in the step 11 is checked in the step 14B. In the present example, the three-plane method is selected. The part codes of the design objects, size data and installation position coordinates thereof are fetched from the memory area 7c7 (step $14C_1$). Thus, the size data and the installation position coordinate of the reducer (RE-10) are fetched. In the step 19, the processing of the steps $14D_1$–$14I_1$ is carried out as it is done in the step 14. In the step 19 which includes the steps $14D_1$–$14I_1$, the plan view, front view and side view of the reducer (RE-10) are generated, and the coordinates of points constituting the lines of those views are sent to the image data memory 4, which stores those coordinates therein. In the step $14J_1$ of the step 19, the presence or absence of the part code which is stored in the memory area 7c1 and which is not graphically represented is checked. If there is such a part code, the steps $14D_1$-$14I_1$ and $19B_1$ are repeated. If there is no such part code in the step $14J_1$, the process goes to the step $14K_1$.

In the step $14K_1$ of the step 19, the part codes which are stored in the memory area 7c7 and the part codes which are directly connected to those part codes through pipes and which are stored in the memory area 7c4 are selected, by referencing the sequence of connection of pipes (FIG. 3) for the line code HD9 stored in the memory 7c2. In the present example, "RE-10" and "A-22" are selected. Then, the processing of the steps $14L_1$–$14Q_1$ is carried out in the step 19 as well. The plan view, front view and side view of the pipe path which directly connects the objects corresponding to the two part codes (RE-10 and A-22 in the present example) are generated, and the coordinates of points constituting the lines of those views are sent to the image data memory 4. The pipe path may be determined by the method disclosed in Japanese Patent Application No. 58-187033 mentioned above. In the step $14R_1$ of the step 19, the presence or absence of the pipe path which directly connects the part code stored in the memory area 7c7 and the part code which is stored in the memory area 7c4 and and which is to be connected to said part code, and which pipe path is not graphically represented, is checked. If there is such a pipe path, the steps $19C_1$, $14L_1$–$14Q_1$ and $19D_1$ are repeated. If there is no such pipe path in the step $19D_1$, a step 20A shown in FIG. 19A is carried out. In the present example, since "RE-10" and "N21-F10" are connected, the steps $14K_1$, $14L_1$–$14Q_1$ and $14R_1$ are repeated in the step 19.

Figure 12C:
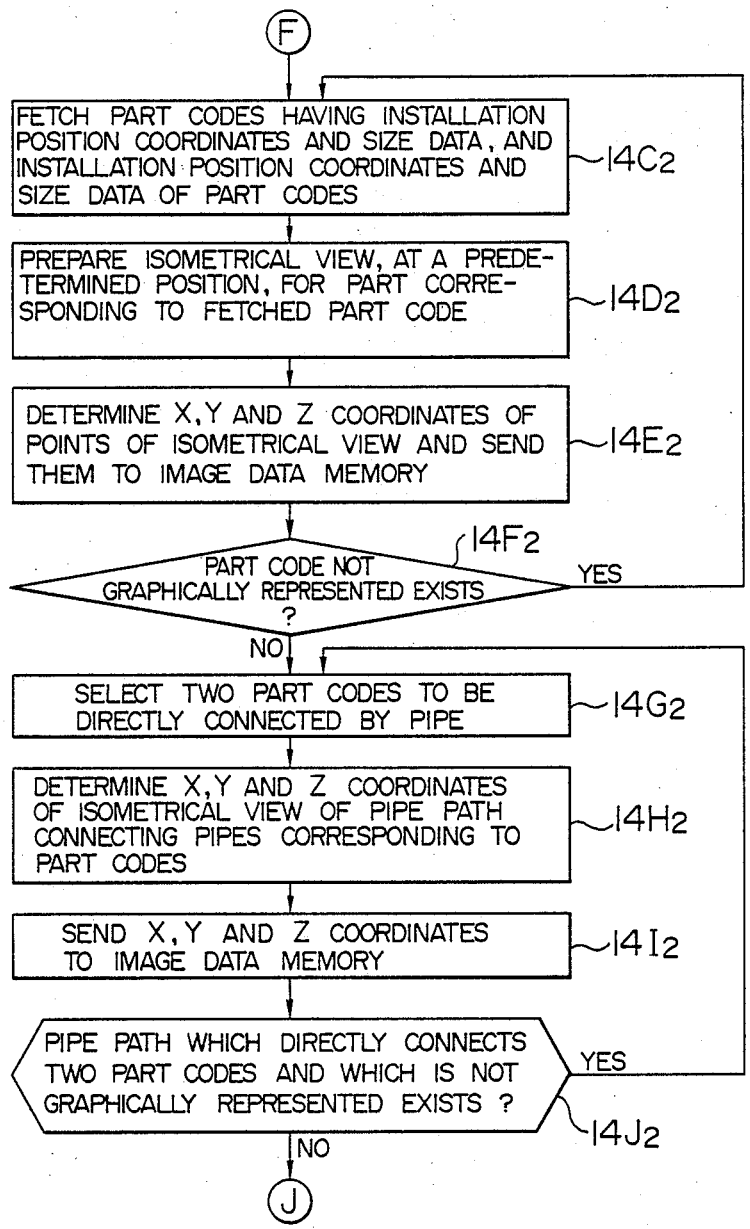

If the selection of the isometrical method is detected in the step 14B of the step 19, the processing shown in FIG. 12C is carried out. In the step 14C$_2$ of the step 19, the code of the object and the size data and installation position coordinate of the object, which are stored in the memory area 7c7 are fetched. The steps 14D$_2$ and 14E$_2$ of the step 19 are then carried out. In the step 14F$_2$ of the step 19, the presence or absence of the code which is stored in the memory area 7c7 and which is not graphically represented is checked. If there is such a code, the steps 14C$_2$, 14D$_2$, 14E$_2$ and 14F$_2$ are repeated. If there is no such code in the step 14F$_2$, the process goes to the step 14G$_2$, which is identical to the step 14K$_1$. The processing of the steps 14H$_2$ and 14I$_2$ is also carried out in the step 19. Finally, the step 14J$_2$ which is identical to the step 14R$_1$ of the step 19 is carried out. If the decision in the step 14J$_2$ is yes, the steps 14G$_2$, 14H$_2$, 14I$_2$ and 14J$_2$ are repeated. If the decision in the step 14J$_2$ is no, the process goes to the step 20 of FIG. 7.

If the selection of the perspective view is detected in the step 14B of the step 19, the processing similar to that of FIG. 12D is carried out. The steps for the perspective view of the step 19 are essentially the same as those for the isometrical view of the step 19 with replacement of "isometrical view" by "perspective view". Accordingly, detailed explanation thereof is omitted here. If the decision in the step 14J$_3$ of the step 19 is no, the process goes to the step 20 of FIG. 7.

After the step 19 in which the supplemented parameters of the design object item are graphically represented and displayed, the operation unit 7a carries out the processing of the step 20 of FIG. 7. The processing of the step 20 (graphic representation and display of restriction area relating to supplemented parameters) is similar to that shown in FIGS. 13A–13D. In the step 15A of the step 20, all design references relating to the part codes or pipe paths graphically represented in the step 19 are fetched from the memory area 7c3 of the intermediate data memory 7c. In the step 20, the processing of the steps 15B and 15C is sequentially carried out. If the selection of the three-plane method is detected in the step 15C of the step 20, the steps 15D$_1$–15M$_1$ of the step 20 are carried out. If the selection of the isometrical method is detected in the step 15C of the step 20, the steps 15D$_2$–15G$_2$ of FIG. 13C are carried out, and if the selection of the perspective view is detected in the step 15C, the steps 15D$_3$–15G$_3$ of FIG. 13D are carried out.

If the decision in the step 15M$_1$ of FIG. 13B, the step 15G$_2$ of FIG. 13C or the step 15G$_3$ of FIG. 13D is no, the process goes to the step 21 of FIG. 7.

In the present example, the design reference No. 2 of FIG. 6B is selected in the step 15A of the step 20, and the restriction area for the design reference is graphically represented in the three-plane method.

Figure 18:
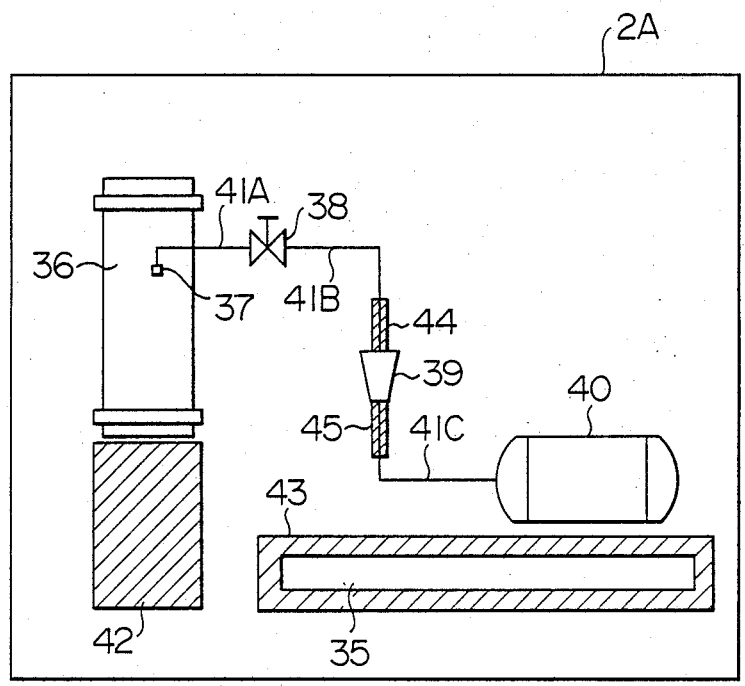
FIG. 18 shows an image in which devices having undefined parameters are additionally displayed.

The image display controller 3 fetches the graphic data which was generated in the steps 19 and 20 and stored in the image data memory 4 and displays it on the display device 2A. FIG. 18 shows an image displayed on the display device 2A after the steps 19 and 20. Numeral 39 denotes the reducer (RE-10). The pipes 41B and 41C connect the reducer 39 to the sluice valve 38 and the tank 40, respectively. The restriction areas 44 and 45 are for the design reference No. 2 shown in FIG. 6B. Since there is no undefined parameter, the undefined parameter 46 shown in FIG. 2 is no longer displayed.

The operation unit 7a carries out the step 21 shown in FIG. 7. In the step 21, the violation or non-violation of the design reference by the part for the part code having the parameter thereof supplemented in the step 18 is checked. The coordinates of the patterns of the parts relating to the part codes stored in the memory area 7c7 and the pipe paths to be directly connected to those parts are fetched. The coordinates of the points of the patterns of the restriction areas for the design references relating to the part codes are fetched. While not described in the step 19, the coordinates of the points of the patterns generated in the step 19 are also stored in the intermediate data memory 7c. The coordinates of the points of the patterns generated in the step 14 and the patterns of the restriction areas generated in the steps 15 and 20 are also stored in the intermediate data memory 7c. The positional relationship between the objects for the part codes and the restriction areas for the design references is determined. Violation or non-violation of the design references by the objects for the part codes is checked. The result is stored in the memory area 7c8 of the intermediate data memory 7c. Finally, the presence or absence of the part code which is stored in the memory area 7c7 and for which violation/non-violation has not yet been checked is checked. If there is such a part code, the step 21 is repeated. If there is no such part code, the process goes to the step 22 or 23.

In the present example, the following processing is carried out in the step 21. "RE-10" has been stored in the memory area 7c7 as the part code which includes the undefined parameter. The violation or non-violation to the design references by the parameter supplemented to RE-10 has been checked. The design reference for the reducer (RE-10) 38 is shown by No. 2 in FIG. 6B. The coordinates of the points of the pattern of the restriction area (the value three times of the pipe diameter D is particularly important) for the design reference and the coordinates of the patterns of the pipes 41B and 41C to be connected to the reducer 39 are compared. If curved portions of the pipes 41B and 41C are outside of the restriction areas 44 and 45, non-violation of the design reference by the position of the reducer 39 is detected. If the curved portions are inside of the restriction areas, violation of the design reference by the position of the reducer 39 is detected.

If there is an object which violates the design reference in the decision of the step 21D, the process goes to the step 22. The step 22 is carried out by the operation unit 7a. In the step 22, the violated design reference and the violating portions of the pattern are displayed. The coordinates which violate the design reference are selected from the coordinates of the points of the patterns stored in the intermediate data memory 7c in the steps 19 and 20 and they are displayed on the screen of the display device 2A. Color codes (or intensities) which indicate the violation are added to the violating coordinates of the pattern selected by the operation unit 7a and the coordinates are sent to the image data memory 4. The violating area is displayed on the display device 2A in the predetermined color (or intensity). The violating area may be displayed only for the restriction area pattern or design object item pattern. The operation unit 7a also adds the violating part codes to the design reference together with the predetermined color code (or intensity) and sends them to the image data memory 6, which displays them on the display device 2B in the predetermined color (or intensity). In the step 21, the violating area is directly displayed on the pattern displayed on the screen of the display device 2A so that the operator can identify the violating area of the pattern.

The operator, while he/she looks at the screen on which the violating area is displayed in the step 22, corrects the item of the undefined parameter of the object which caused the violation, through the console panel 8. The correction is fetched into the processor 7 in the step 18A, and the steps 18-22 are repeated until nonviolation is detected in the step 21. Since the design data and the design references are displayed even when the data for the item of the undefined parameter of the object which caused the violation is corrected, the operator can recognize the information from the screen and appropriately correct the data for the item of the undefined parameter.

The decision in the step 21 may be made not only to those related to the parts for the part codes having their parameters supplemented in the step 18 but also to all parts relating to the design object item for confirmation purpose. In this case, the data for the objects relating to the codes stored not only in the memory area 7c7 but also in the memory area 7c2 are fetched in the step 21. The above processing is repeated until all objects stored in the memory areas 7c2 and 7c7 have been checked for the violation. The steps 21 and 22 are carried out between the steps 15 and 16.

If there is no part which violates the design reference in the step 21, the data for the item of the parameter supplemented in the step 18A is registered as the design data of the part code (step 23). The operation unit 7a fetches the data for the item of the parameter supplemented in the step 18 together with the code therefor, of the non-violating parts stored in the memory area 7c8 of the intermediate data memory 7c, and sends them from the design data output unit 7k to the external memory 9, which stores therein the data for the item of the parameter. In the step 21, the new data for the design data which does not violate the design reference are stored in the external memory 9 and the new data may be effectively utilized in the subsequent design.

As the steps 21 and 22 are carried out between the steps 15 and 16 and non-violation by the correction data is detected in the step 21, the correction data (correction to the design data) is stored into the external storage 9 in the step 23.

As the step 23 is completed, the design for one design object item (system HD in the present example) is completed. The operation unit 7a is checked in the step 24 to determine whether any other design object item exists. If there is such a design object item, the operation unit 7a retrieves the remaining design object item stored in the intermediate data memory 7c and sends it from the output unit 7j to the image data memory 6. The image display controller 5 fetches the remaining design object item from the image data memory 6 and displays it on the display device 2B. When the remaining design object item is displayed, the image shown in FIG. 16 is erased. The operator selects one of the design object items displayed on the display device 2B and enters the line code thereof to the processor 7 through the console panel 8. Thus, the operation unit 7a again carries out the steps 11-24 shown in FIG. 7. If there is no design object item in the step 24, the operation unit 7a sends a message "no design object item" from the output unit to the image data memory 6. This message is displayed by the image display controller 5 on the display device 2B. This completes the design for all design object items.

Another embodiment of the present invention is now explained. In the present embodiment, the display device 2B, image display controller 5 and image data memory 6 of the previous embodiment have been eliminated. Thus, the information sent from the output unit 7j is stored in the image data memory 4 and displayed by the image display controller 3 on the display device 2A.

Figure 19:
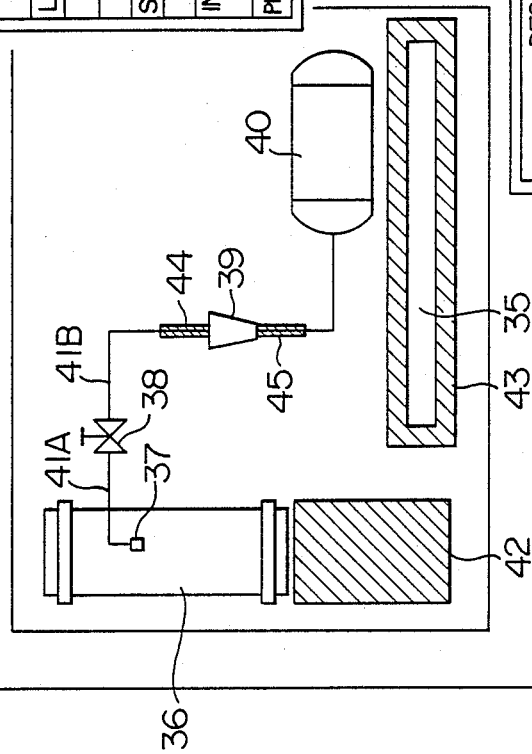
FIG. 19 shows an image displayed in another embodiment of the present invention.

An example of an image displayed on the display device 2A in the present embodiment is shown in FIG. 19. The images which were displayed on the display devices 2A and 2B in the previous embodiment are now displayed concurrently on the single display device 2A. The present embodiment can attain the same advantages as those attained by the previous embodiment. Furthermore, since a portion of the hardware configuration can be saved, the design support apparatus can be simplified.

Figures 20, 21:
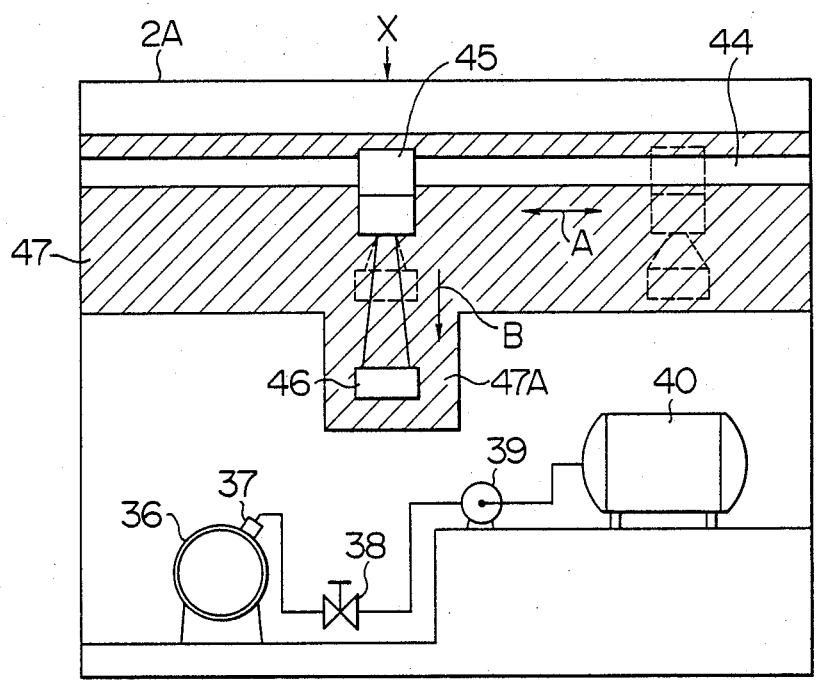
FIG. 20 shows design reference data for a movable member.
FIG. 21 shows an image in which a restriction area derived from the movable member is displayed.

As an alternative of the design reference data, design reference data shown in FIG. 20 may be prepared, in which a move zone of a movable member is defined as an inhibit zone for installation of devices and pipes. In FIG. 21, a restriction area 47 is displayed on the display device 2A in accordance with the design reference data shown in FIG. 20. FIG. 21 shows a front view of arrangement of the devices shown in FIG. 18, and the like elements to those of FIG. 18 are designated by the like reference numerals. A rail 44 for a whist crane 45 spans at the top of the screen 2A and the whist crane suspended by the rail 44 is laterally movable as shown by an arrow A. The whist crane 45 has a container 46 in which parts are accommodated. As the container 46 reaches a part transportation point (e.g. point X), the whist crane 45 lowers the container 46 as shown by an arrow B to allow an operator to take out parts from the container 46 or put the parts into the container 46. The pipes cannot be arranged in the move zone of the whist crane 45. However, since the move zone of the movable member is not actually visible, it is easily overlooked in the design stage, and after the design has been completed, it is necessary to effect a redesign while the operator takes the move zone of the movable member into account. In accordance with the present invention, the design reference data shown in FIG. 20 is prepared and stored in the external storage 10, and the operation unit 7a fetches the design reference data and displays the restriction area 47 corresponding to the move zone of the whist crane 45 on the display device 2A as shown in FIG. 21. The restriction area 47 includes a projection inhibit area 47A which indicates a descend zone of the container 46 of the whist crane 45. Since the operator can design while he/she takes the restriction area 47 into account, a design error is further lessened. While the whist crane 45 is shown in FIG. 21 for illustration purpose, the whist crane 45 need not be displayed so long as the restriction area 47 is displayed on the screen. Where a component of the design object is movable, a move zone of the component may be displayed as the restriction area.

The embodiments herein described can be applied to the design of layout of devices and pipes in a plant such as chemical plant, nuclear power plant or heat power plant, and the design of layout of devices and pipes in a building. It may also be applied to the design of layout of devices and wirings in a semiconductor chip.

In accordance with the present invention, since the restriction area based on the design reference can be displayed on the screen, the operator can recognize the restriction area and design the layout of the objects in an effective way such that the objects do not enter into the restriction area. Accordingly, the violation to the restriction items for the design reference in the design of the layout of the objects is substantially reduced and the design time is substantially shortened.

We claim:

1. A design support method, for use in a design support apparatus including input means; a display device; a memory device; and a data processor connected to said input means, said display device and said memory device, for performing design support operations, comprising the steps of:
   selecting, by said processor, design data and design reference data for a design object designated by said input means from design data and design reference data stored in said memory device;
   generating, by said processor, second information for graphically representing a restriction area for the structure of said design object based on said selected design reference data, said restriction area excluding an area occupied by the structure of said design object; and
   displaying, by said processor, a graphic pattern representing the structure of said design object and a graphic pattern representing said restriction area on said display device.

2. A design support method according to claim 1 wherein said graphic pattern representing said restriction area represents an inhibit area to inhibit at least a portion of said design object from entering into the inhibit area.

3. A design support method according to claim 1 wherein said graphic pattern representing said restriction area has a size determined by at least a portion of said design object.

4. A design support method according to claim 2 wherein said inhibit area represents an area necessary for assembling said design object.

5. A design support method according to claim 2 wherein said inhibit area includes a move zone of a movable member.

6. A design support method according to claim 1 wherein said graphic pattern representing said restriction area is displayed on said display device in a color or a hatched pattern different from that of said graphic pattern representing the structure of said design object.

7. A design support method according to claim 1 wherein said graphic pattern representing the structure of said design object and said graphic pattern representing said restriction area are displayed on said display device in the same positional relationship as that between the actual design object and the actual restriction area.

8. A design support method according to claim 1 wherein said memory stores therein the design data for said design object and the design data for components of said design object, and said selection step includes the sub-steps of:
   fetching the design data for said design object from said memory;
   retrieving the components of said design object from the fetched design data; and
   fetching the design data for the retrieved components from said memory.

9. A design support method according to claim 8 wherein each of said design reference data has condition data with at least one condition item, and said selection step further includes the sub-steps of:
   fetching the design reference data including the condition item related to the fetched design data, from said memory;
   determining if all the condition items of the condition data of the fetched design reference data are met with said design data; and
   selecting only the design reference data having the condition with all the condition items met.

10. A design support method according to claim 1 wherein said display step includes the sub-step of selecting one of a plurality of predetermined representation forms and displaying the graphic pattern representing said design object and the graphic pattern representing said restriction area in the selected representation form.

11. A design support method according to claim 1 further comprising the steps of:
    retrieving from said selected design data a design data having an undetermined parameter; and
    displaying the retrieved design data having the undetermined parameter on said display device.

12. A design support method according to claim 11 further comprising the steps of:
    waiting for entry of data for entering the undetermined parameter after the design data having the undetermined parameter has been displayed; and
    additionally displaying on said display device the graphic pattern representing a portion of said design object relating to the data entered for the undetermined parameter.

13. A design support method according to claim 12 further comprising the steps of:
    retrieving the design reference data relating to the design data having the undertermined parameter entered; and
    displaying the restriction area for the retrieved design reference data on said display device.

14. A design support apparatus comprising:
    a console panel for designating a design object;
    a first memory for storing therein design data;
    a second memory for storing therein design reference data;
    a third memory for storing therein a procedure for selecting design data from said first memory based on the design object entered from said console panel, generating first information for graphically representing a structure of said design object based on said selected design data, selecting design reference data from said second memory based on said design object entered from said console panel, and generating second information for graphically representing a restriction area for the structure of said design object based on said selected design reference data, said restriction area excluding an area occupied by the structure of said design object;
    processing means for generating said first and second information in accordance with said procedure; and
    a display device for displaying said first and second information outputted by said processing means.

15. A design support apparatus according to claim 14 wherein said first memory stores therein the design data for said design object and the design data for components of said design object, and said processing means fetches the design data for said design object from said first memory, retrieves the components of said design object from the fetched design data, and fetches the design data for the retrieved components from said first memory.

16. A design support apparatus accrding to claim 15 wherein said second memory stores therein a plurality of design reference data each including at least one condition item to be met, and said processing means fetches from said second memory the design reference data including the condition items related to the design data fetched from said first memory, determining if all the condition items of the condition data of the fetched design reference data are met with said design data, and selecting only the design reference data having the condition data with all the condition items met.

17. A design support apparatus according to claim 14 wherein said display device includes a first display screen for displaying graphic patterns representing said first and second information, and a second display screen for displaying the design data for said design object and the related design reference data.

18. A design support apparatus according to claim 14 wherein said display device displays the design data for said design object and the related design reference data on the display screen for displaying the graphic patterns representing said first and second information.

19. A design support apparatus comprising:
 means for selecting design data and design reference data for a designated object from design data and design reference data stored in a memory;
 means for generating first information for graphically representing a structure of said design object based on said selected design data;
 means for generating second information for grahically representing a restriction area for the structure of said design object based on said selected design reference data, said restriction area excluding an area occupied by the structure of said design object; and
 means for displaying a graphic pattern representing the structure of said design object and a graphic pattern representing said restriction area on a display device.

20. a design support apparatus according to claim 19 wherein said graphic pattern represesnting said restriction area represents an inhibit area to inhibit at least a portion of said design object from entering into the inhibit area.

21. A design support apparatus according to claim 19 wherein said graphic pattern representing said restriction area has a size determined by at least a portion of said design object.

22. A design support apparatus according to claim 20 wherein said inhibit area represents an area necessary for assembling said design object.

23. A design support apparatus according to claim 20 wherein said inhibit area includes a move zone of a movable member.

24. a design support apparatus according to claim 19 wherein said graphic pattern representing said restriction area is displayed on said display device in a color or a hatched pattern different from that of said graphic pattern representing the structure of said design object.

25. A design support apparatus according to claim 19 wherein said graphic pattern representing the structure of said design object and said graphic pattern representing said restriction area are displayed on said display device in the same positional relationship to that between the actual design object and the actual restriction area.

26. A design support apparatus according to claim 19 wherein said memory stores therein the design data for said design object and the design data for components of said design object, and said selection means includes:
 means for fetching the design data for said design object from said memory;
 means for retrieving the components of said design object from the fetched design data; and
 means for fetching the design data for the retrieved components from said memory.

27. A design support apparatus according to claim 26 wherein each of said design reference data has at least one condition item related to the fetched design data, from said memory;
 means for determining if all the condition items of the condition data of the fetched design reference data is met based on said design data; and
 means for selecting only the design reference data having the design references met.

28. A design support apparatus according to claim 19 wherein said display means includes means for selecting one of a plurality of predetermined representation forms and displaying the graphic pattern representing said design object and the graphic pattern representing said restriction area in the selected representation form.

29. A design support apparatus according to claim 19 further comprising:
 means for retrieving a design data having an undefined parameter from said selected design data; and
 means for displaying the retrieved design data having the undefined parameter on said display device.

30. A design support apparatus according to claim 29 further comprising:
 means for waiting for entry of data for supplementing the undefined parameter after the design data having the undefined parameter has been displayed; and
 means for additionally displaying on said display device the graphic pattern representing a portion of said design object relating to the data supplemented for the undefined parameter.

31. A design support apparatus according to claim 30 further comprising:
 means for retrieving the design reference data relating to the design data having the undefined parameter supplemented; and
 means for displaying the restriction area for the retrieved design reference data on said display device.

* * * * *